(12) United States Patent
Koussios et al.

(10) Patent No.: US 8,087,536 B2
(45) Date of Patent: Jan. 3, 2012

(54) PRESSURIZABLE STRUCTURES COMPRISING DIFFERENT SURFACE SECTIONS

(75) Inventors: Sotiris Koussios, Delft (NL); Otto Korneles Bergsma, Delfgauw (NL); Adriaan Beukers, Heemstede (NL)

(73) Assignee: Technische Universiteit Delft (NL)

( * ) Notice: Subject to any disclaimer, the term of this patent is extended or adjusted under 35 U.S.C. 154(b) by 820 days.

(21) Appl. No.: 10/523,878

(22) PCT Filed: Aug. 8, 2002

(86) PCT No.: PCT/NL02/00534
§ 371 (c)(1),
(2), (4) Date: Aug. 22, 2005

(87) PCT Pub. No.: WO2004/015312
PCT Pub. Date: Feb. 19, 2004

(65) Prior Publication Data
US 2006/0049195 A1    Mar. 9, 2006

(51) Int. Cl.
F17C 1/00 (2006.01)
F17C 1/06 (2006.01)
B29C 70/08 (2006.01)

(52) U.S. Cl. .................. 220/581; 220/588; 428/36.3
(58) Field of Classification Search ............... 220/581, 220/586, 588, 589, 590; 428/36.3; 92/47
See application file for complete search history.

(56) References Cited

U.S. PATENT DOCUMENTS

| | | | | |
|---|---|---|---|---|
| 3,315,704 A | * | 4/1967 | Shire | 138/121 |
| 3,321,200 A | | 5/1967 | Polhemus et al. | 267/65 |
| 3,862,878 A | * | 1/1975 | Azuma | 138/123 |
| 4,440,587 A | | 4/1984 | Thompson et al. | 156/154 |
| 4,701,231 A | * | 10/1987 | Peters et al. | 156/172 |
| 4,777,868 A | | 10/1988 | Larsson | 92/42 |
| 5,385,262 A | | 1/1995 | Coquet et al. | 220/589 |
| 5,937,732 A | * | 8/1999 | Homann | 92/43 |

FOREIGN PATENT DOCUMENTS

| | | |
|---|---|---|
| EP | 0 626 338 | 11/1994 |
| EP | 626338 A1 * | 11/1994 |
| GB | 1 064 590 | 4/1967 |
| JP | 58181668 * | 4/1985 |
| WO | WO 94/12423 | 6/1994 |

* cited by examiner

*Primary Examiner* — Bryon Gehman
*Assistant Examiner* — Shawn Braden
(74) *Attorney, Agent, or Firm* — Michaelson & Associates; Peter L. Michaelson; Peter A. Luccarelli, Jr.

(57) ABSTRACT

Composite pressurizable structures overwound with fibers or braided bundles of fibers are described. The pressurizable structures comprise one or more axial sections which themselves comprise both concave and convex surfaces. The shape characteristics are related to geodesic as well as to non-geodesic trajectories of the fibers. Axial sections of the pressurizable structures can be rotated, expanded, or bended with respect to their longitudinal axis. Such pressurizable structures may be used in pressure vessels, flexible pipelines, spring elements, robotic actuators, adaptive buildings among other uses. Manufacturing techniques facilitated by the present structures allow for the construction of very large structures.

10 Claims, 24 Drawing Sheets

PRESSURIZABLE STRUCTURES COMPRISING DIFFERENT SURFACE SECTIONS

The invention relates to pressurizable structures comprising a gas- or fluid-tight body overwound with a number of fibre filaments, whereby the radius of the body varies along a rotation-symmetrical axis of the structure.

Pressurizable structures of the above-indicated type are well known in the art. A known pressurizable structure may comprise a body of which the radius varies with respect to a rotation-symmetrical axis of the structure, such that the body comprises a number of convex surface sections each having a local maximum radius, such as with isotensoidal or cylindrical bodies. When under internal pressure, such bodies form part of rigid, pressure-resistant structures.

It is an object of the invention to provide pressurizable structures of which the radius of the body varies with respect to a rotation-symmetrical axis of the structure, which structures when under pressure offer stiffness and strength of an order as that provided by known pressurizable structures of which the body comprises a number of convex surface sections.

It is another object of the invention to provide for pressurizable structures of the above-indicated type with a low requirement of material in regard of production and a large reduction in weight of the pressurizable structure.

Either or both objects are achieved by means of a fibre-reinforced pressurizable structure, which fibre-reinforced pressurizable structure comprises a gas- or fluid-tight body overwound with a number of fibre filaments, whereby the radius of the body varies with respect to a rotation-symmetrical axis of the structure, such that said body comprises a number of concave surface sections each having a local minimum radius, and a number of convex surface sections each having a local maximum radius, characterized in that at least one concave surface section is overwound with a fibre such that the longitudinal orientation of the fibre along a finite length thereof is orientated substantially perpendicular with respect to the rotation-symmetrical axis of the structure.

The advantage related to this technical element is that the pressurizable structure which comprises concave and convex surface sections is overwound with a fibre, such that at every locus on the surface of the structure, the fibre is under a constant tension, not only with respect to the convex surface sections but also with respect to concave surface sections of the pressurizable structure. In regard of the fibre, both geodesic trajectories (i.e. with zero friction between the fibre and the surface it lies on) as well as non-geodesic trajectories (non-zero friction between the fibre and the surface it lies on) are achievable.

It is to be noted that the local orientation of the fibre on said concave surface section is intact and that it remains intact during use, even when the structure is not under internal pressure.

This basic concept makes it possible to connect bodies of pressurizable structures, which bodies comprise different surface sections, together by means of continuous overwinding, i.e. without the use of interconnecting means between bodies which are separately overwound. Large pressurizable structures comprising different axial sections, including axial sections having concave surfaces, are achievable whereby the fibre always follows a globular or bulbous trajectory as determined by the isotensoidal shape of the related axial section.

Preferably, the finite length of the fibre comprises a locus at which the fibre undergoes torsion with respect to its longitudinal centre-line. This is advantageous in that the transition between adjoining concave and convex surface sections can be achieved by means of a single fibre. More preferably, the finite length of the fibre comprises a locus at which there is reversal of the side of the fibre which is in contact with the body. This offers the advantage that transitions between adjoining axial sections having concave and convex surfaces whereby a transition occurs over a short length with respect to the rotational-symmetrical axis of the body may also be achieved by means of a single fibre.

According to another embodiment of the invention, the body of the fibre-reinforced pressurizable structure is flexible, i.e. non-rigid, and that the fibres are supported by a matrix material. This is advantageous in that large-scale structures may be constructed as comprising axial sections or substructures with different surfaces, whereby each axial section or substructure is separately foldable and inflatable/deflatable, such that the architecture and the local orientation of the fibre across the surface of the axial sections or substructures remain intact under all conditions of use.

Another advantage of this embodiment is that a part of the pressurizable structure according to the invention, at least an axial section thereof, can be brought into a working position whereby this section is not under internal pressure and thus its being in a compact state, and after being brought into its working position, the axial section being brought under internal pressure to its pressurized operating state. This provides for economical advantage and for access to and operability in tight spaces.

Embodiments comprising axial sections which can be positioned differently with respect to the rest of the pressurizable structure according to the invention, e.g. rotated, translated or bended with respect to the longitudinal axis of the pressurizable structure.

These and other aspects of the invention will be apparent from and elucidated with reference to the embodiment(s) described hereinafter.

Figure 21:
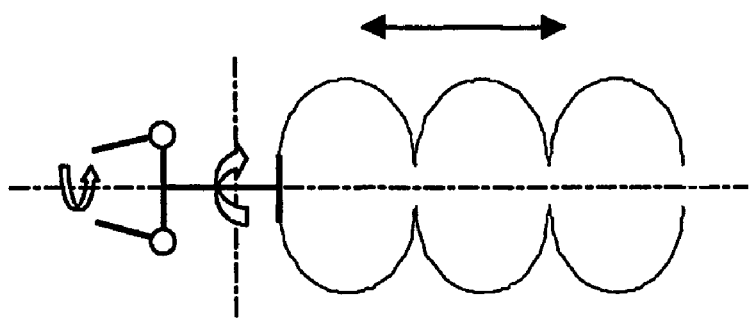
Figure 21:
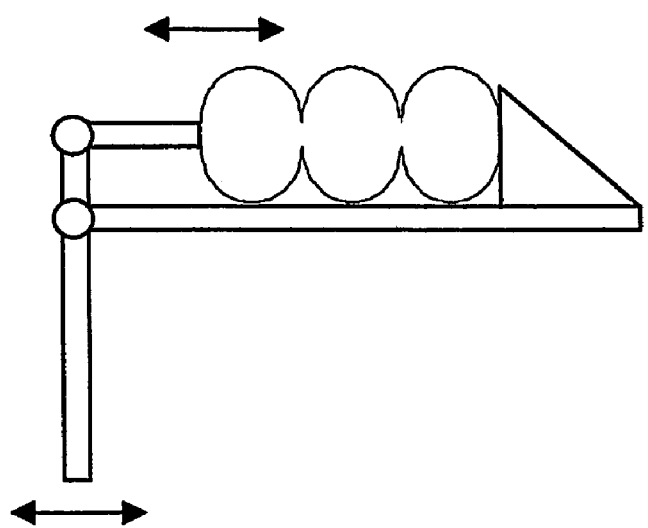
Figure 21:
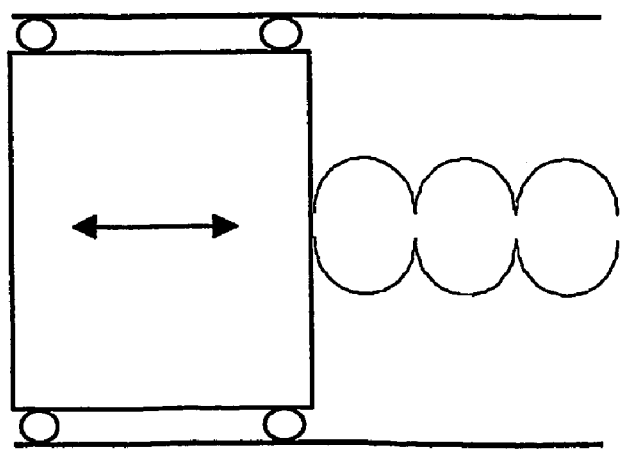
Figure 22:
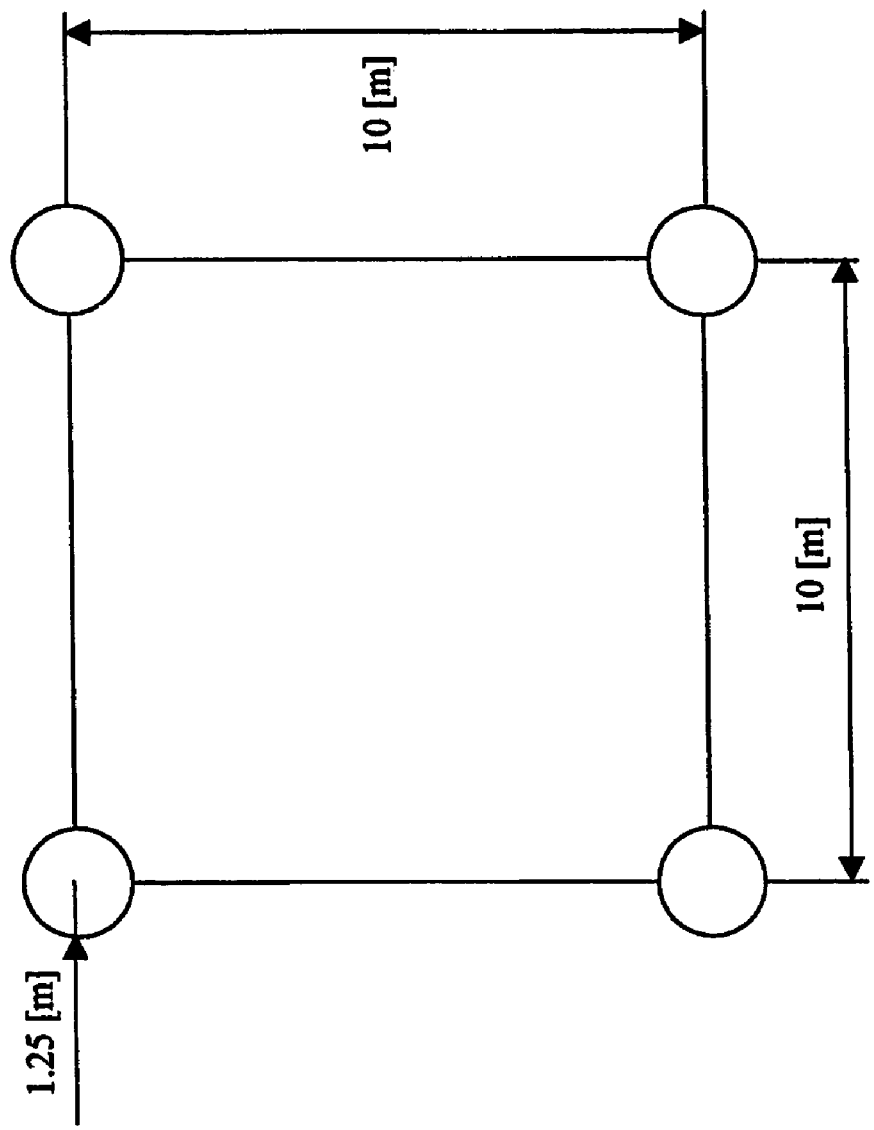
Figure 23:
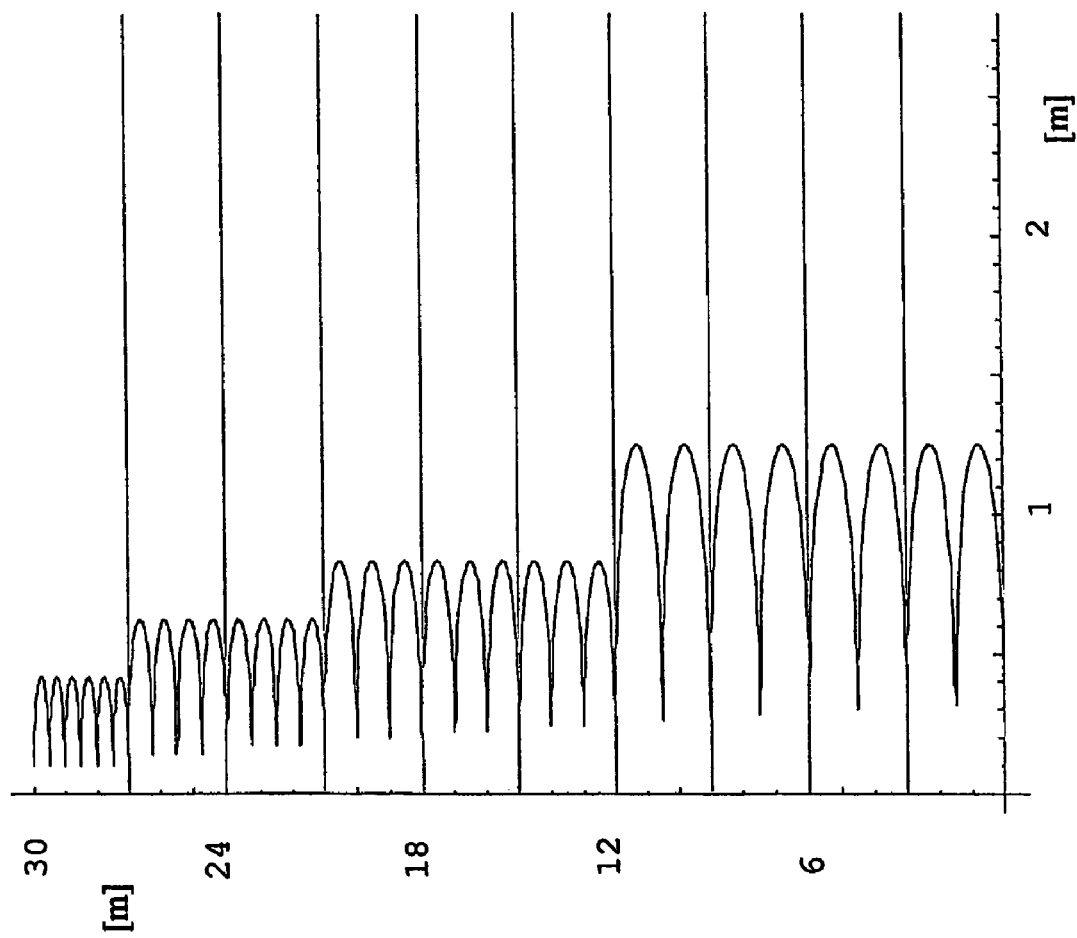
Figure 24:
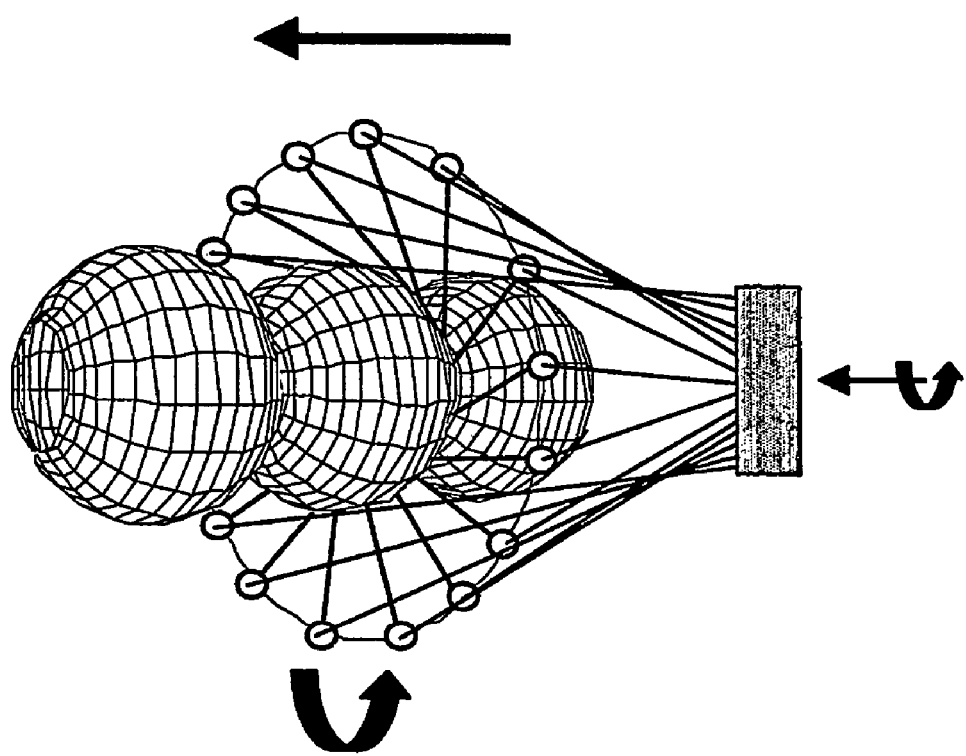

FIGS. 21A, B and C depicts schematically the use of a pressurizable structure according to the invention as an elevator-driving element (21A), an excavator-driving element (21B) and a robotic actuator (21C), respectively;

FIG. 22 depicts schematically a plan view of the ground floor of a pressurizable structure according to the invention which comprises means for a shoring or strutting function, such as construction beams;

FIG. 23 depicts schematically an elevation of a building comprising pressurizable structures according to FIG. 22; and FIG. 24 depicts schematically a step of a method for making a pressurizable structure according to FIG. 22 by means of e.g. braiding.

Figure 1:
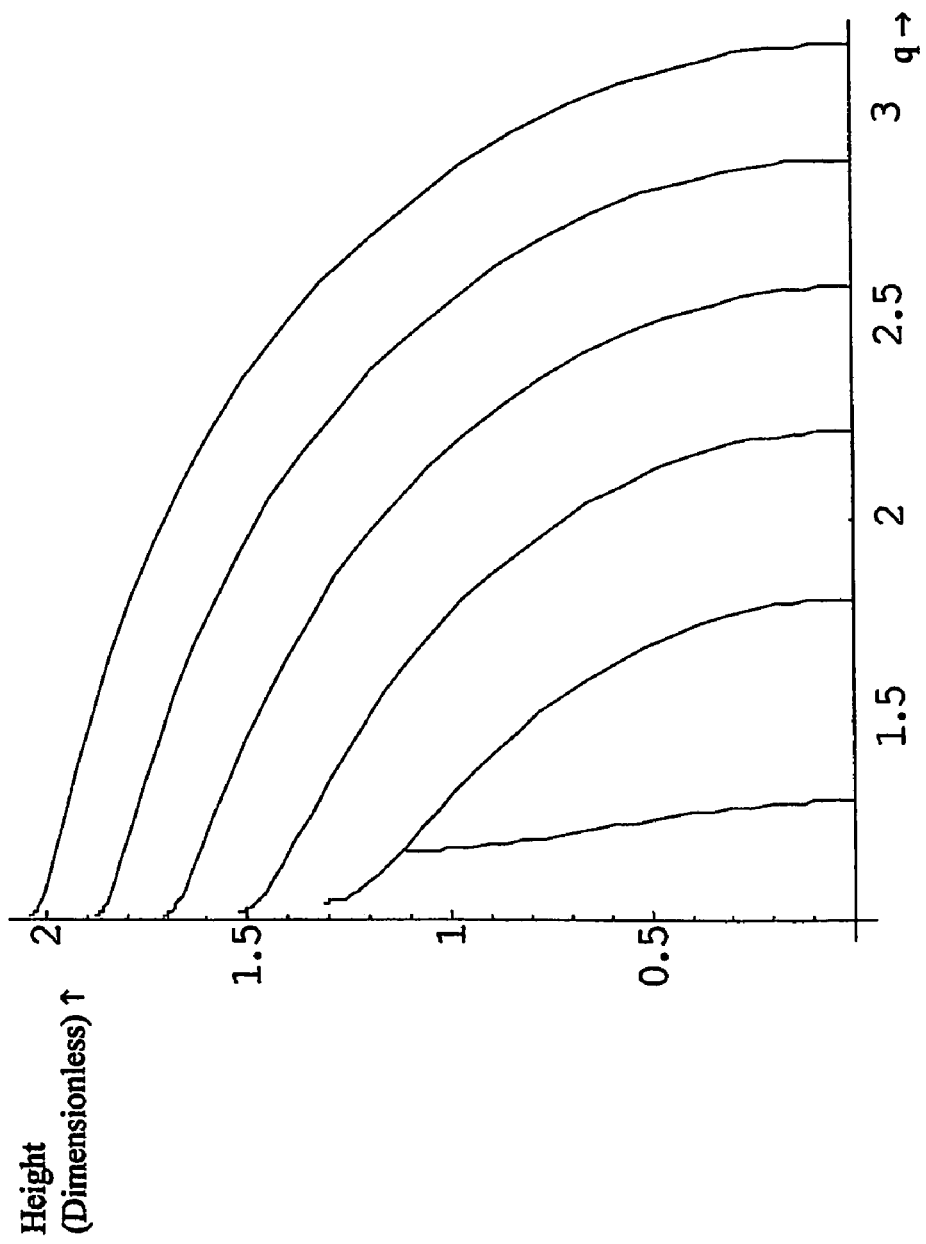
FIG. 1 depicts cross-sections of a number of isotensoidal profiles of the body of a pressurizable structure, to be seen in conjunction with FIG. 4.
Figure 2:
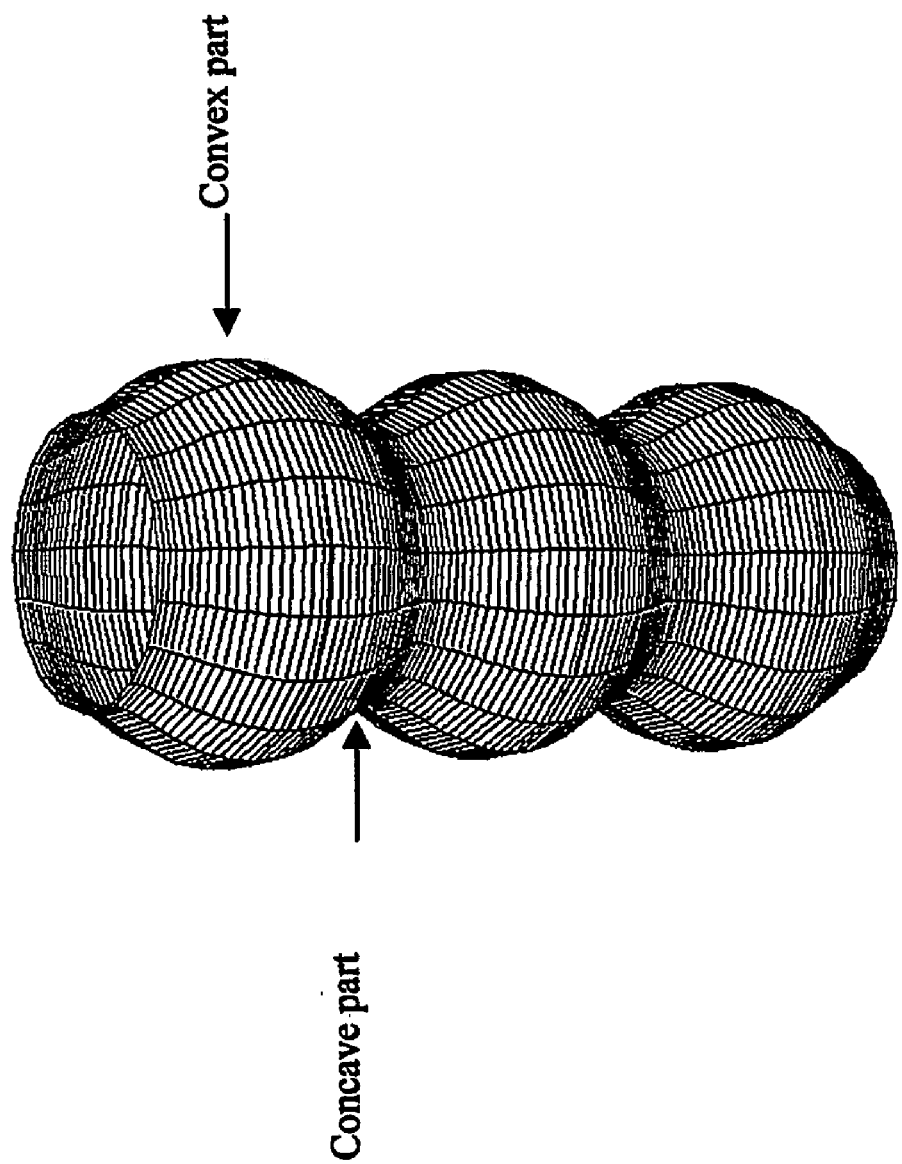
FIG. 2 depicts graphically a pressurizable structure provided with a number of concave surface sections and a number of convex surface sections.

With reference to FIG. 1, almost every isotensoidal body is characterized by an infinite slope at its pole radius and its equator radius. A basic aspect of the invention is embodied in an oblong, quasi-cylindrical pressurizable structure which comprises alternatingly concave and convex surfaces of axial sections as shown in FIG. 2. In regard of the surfaces, it should be noted that the fibre is under a constant tension at every locus of the surface.

Figure 3:
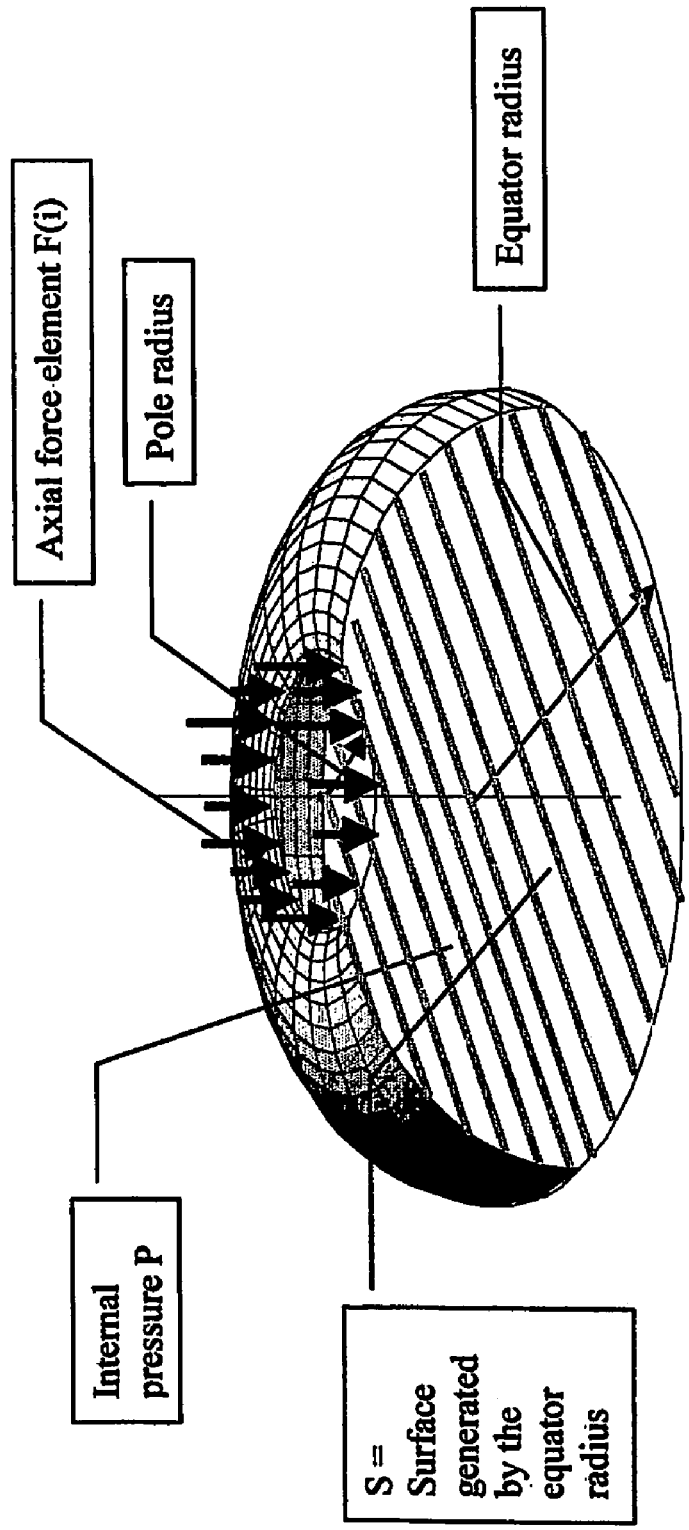
FIG. 3 depicts a graphical representation of forces, surfaces, pressures and radii in light of definitions of the q-factor and r-factor.

The pressurizable structures according to the invention are conveniently defined in terms of the two parameters the q-factor and the r-factor. With reference to FIG. 3, the q-factor is defined as the square of the dimensionless quotient of said local maximum radius of a convex surface section adjacent to the concave surface section in question and the local minimum radius of the concave surface section in question, and the r-factor is defined as the quotient of the total distribution of the axial load on the circumference of said local minimum radius and the internal axial force generated by the internal pressure on the surface of the axial section at said local maximum radius.

Figure 4:
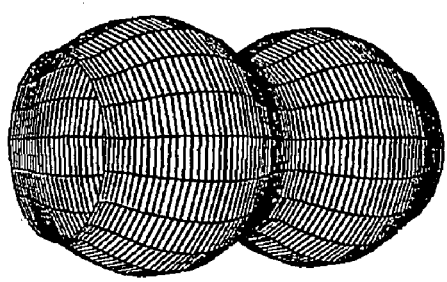
FIG. 4 depicts pressurizable structures having different ratios of the so-called q-factor, to be seen with reference to FIG. 1.
Figure 4:
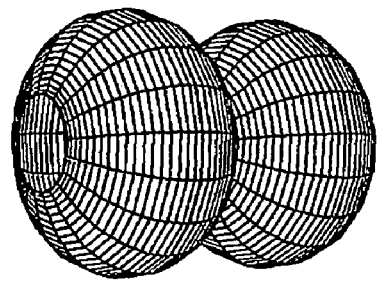
Figure 4:
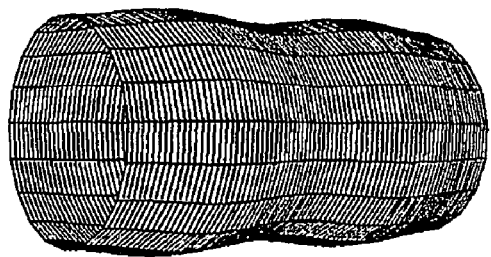
Figure 4:
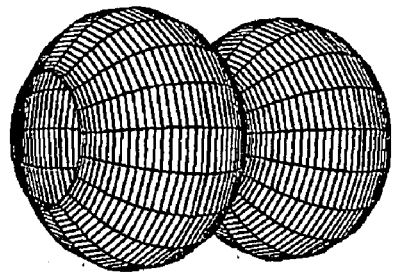

FIG. 4 depicts various combinations of vessels having different values of the q-factor and the r-factor, which combinations allow for different shapes.

Figure 5:
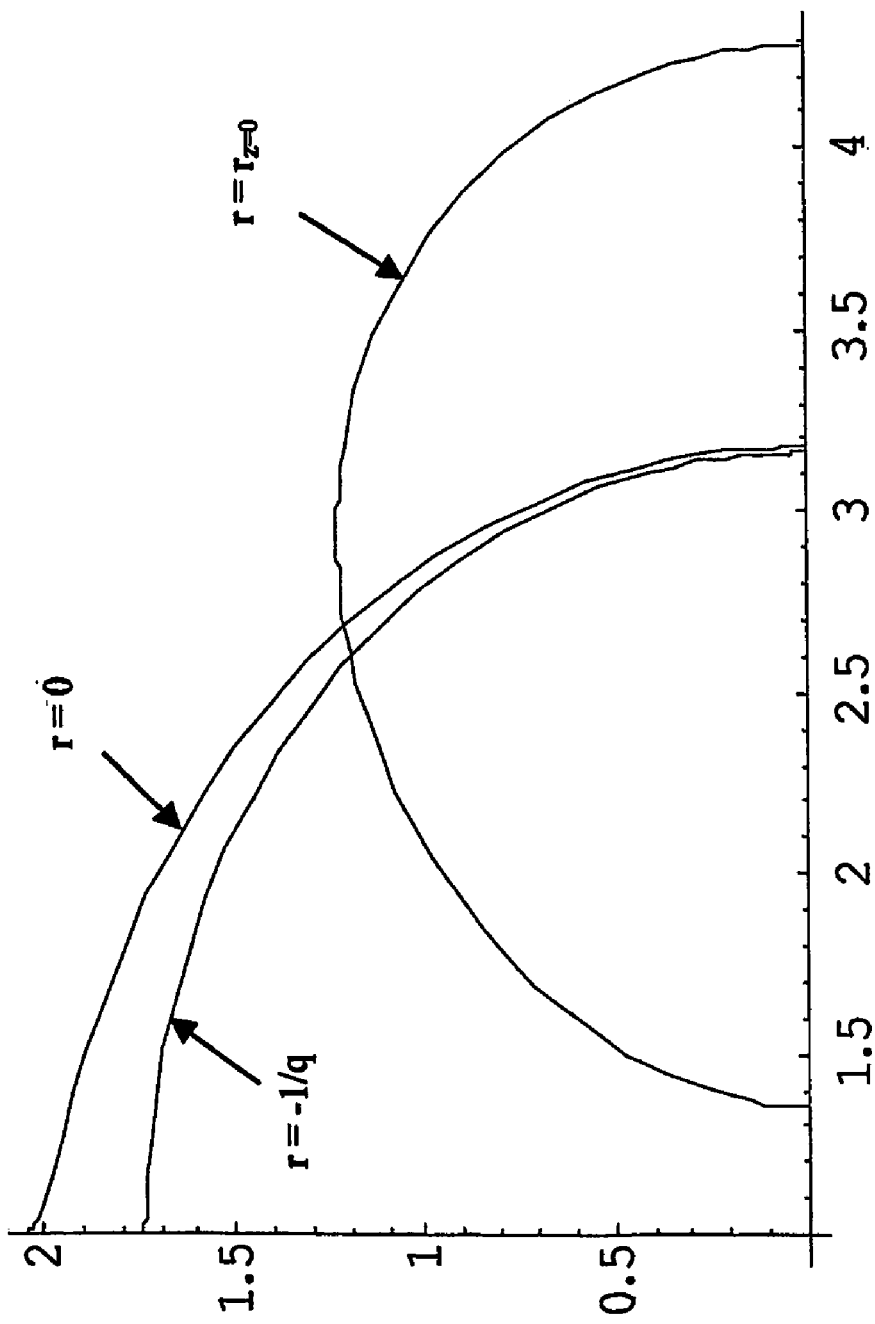
FIG. 5 depicts a graph of some relationships of the so-called r-factor to the geometry of the body of the pressurizable structure.

The ratios of the q-factors and of the r-factors of adjoining axial sections of the pressurizable structure influence the shape of the applied meridian profile. In order to ensure smooth transitional of the connecting fibre between the axial sections, r should not have a value smaller than $-1/q$; in this case, the maximum height (of what?) becomes equal to the height at the pole. The next important r-value is $r(z=0)$ where the height at the pole equalizes zero, see FIG. 5.

Another important property in regard of the pressurizable structure according to the invention is that it allows for overwinding the same with a single fibre bundle. The latter is in contact with the surface throughout, both over convex as well as concave surface sections. Depending on the values of q and r, two different configurations can be followed in regard of the transition of the fibre from one axial section to an adjoining axial section of the structure, see FIG. 6.

In cases whereby the q-factor and the r-factor of the body have values in the ranges of $q=\{1, 12\}$ and $r=\{-1/q, 0\}$, the winding angle at the pole (smallest radius) is approx. equal to $\Pi/2$[rad] and the degree of concavity is generally small, that is: i.e. the radius of normal curvature is large, so that the fibre is in contact with the concave surface section in question with its one and same side throughout and it undergoes a total twist equal to $\Pi$ [rad] over the length of the transition between two sections.

Figure 7:
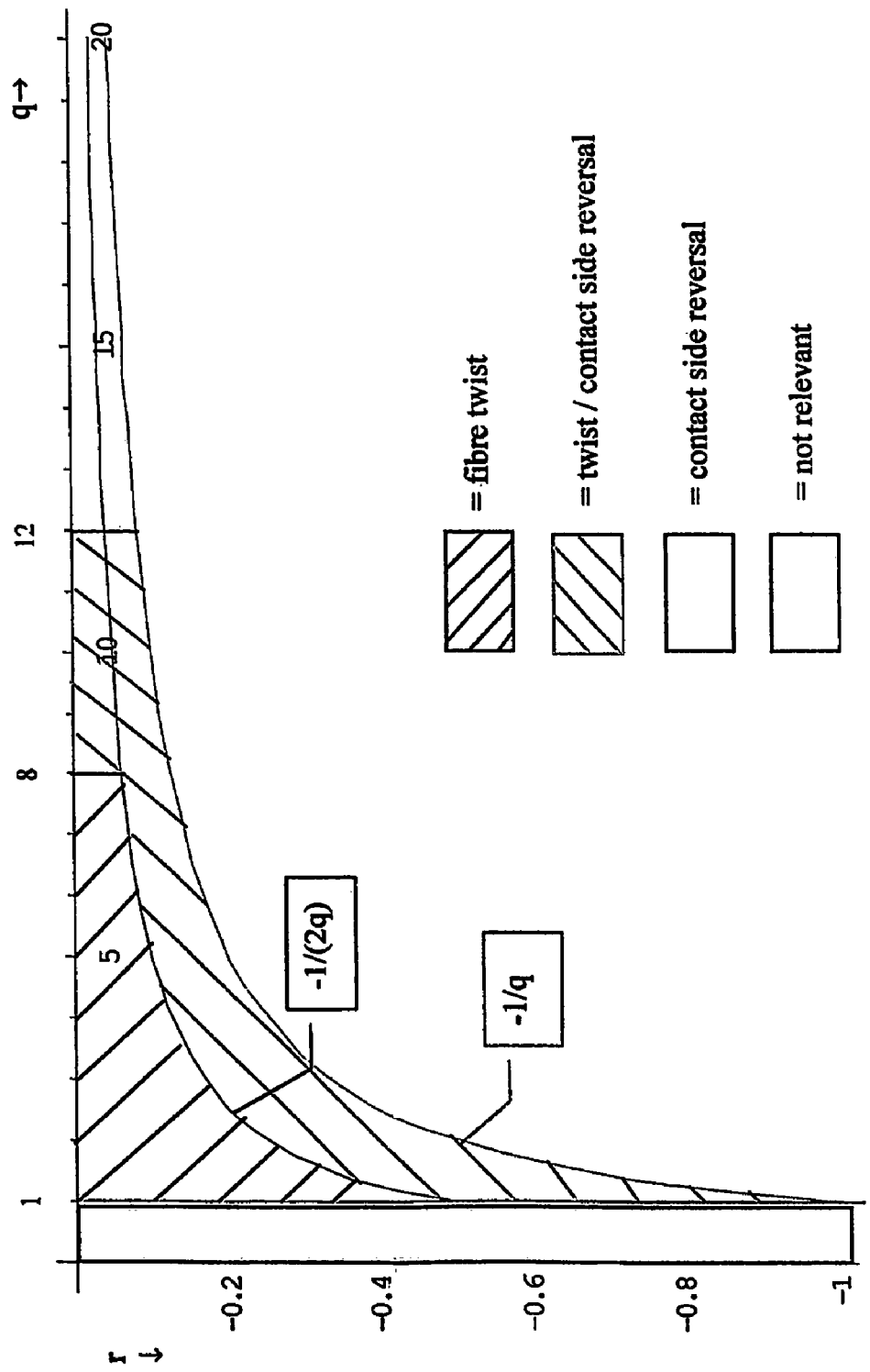
FIG. 7 depicts schematically the occurrence of fibre twist and of reversal of the contact side of the fibre as functions of the q-factor and the r-factor.

In cases whereby the q-factor and the r-factor of the body have values in the ranges of $q=\{1, 8\}$ and $r=\{-1/q, -1/(2q)\}$, or $q=\{8, \infty\}$ and $r=\{0, -1/q\}$, the winding angle at the pole remains equal to $\Pi/2$[rad] while the degree of concavity is generally very large, so that there is reversal of the side of the fibre which is in contact with the concave surface section. Both types of cases are depicted graphically in FIG. 7.

Another important parameter in addition to the q-factor and the r-factor relates to the choice between geodesic- and non-geodesic trajectories of the fibre. A geodesic fibre path does not require any friction between the fibre and the surface its overwinds, while conversely a non-geodesic path for the fibre does require friction.

In regard of geodesic winding: assuming that there is zero friction ($\mu=0$), then it is not possible to make an axial section which has different radii of the pole openings at its ends. This entails that one and the same meridional profile needs to be used for identical adjoining axial sections of the pressurizable structure. in addition, in case of the q-factor having small values, it leads to pole openings with considerable radii.

In regard of non-geodesic winding: depending on the magnitude of $\mu$ and the chosen values of the q-factor and the r-factor, it allows for accommodation of the changing q-factor in regard of transition from one axial section to an adjoining section. The measure of decrease depends mainly on the dimensionless equator radius and $\mu$, see FIG. 8.

Figure 9:
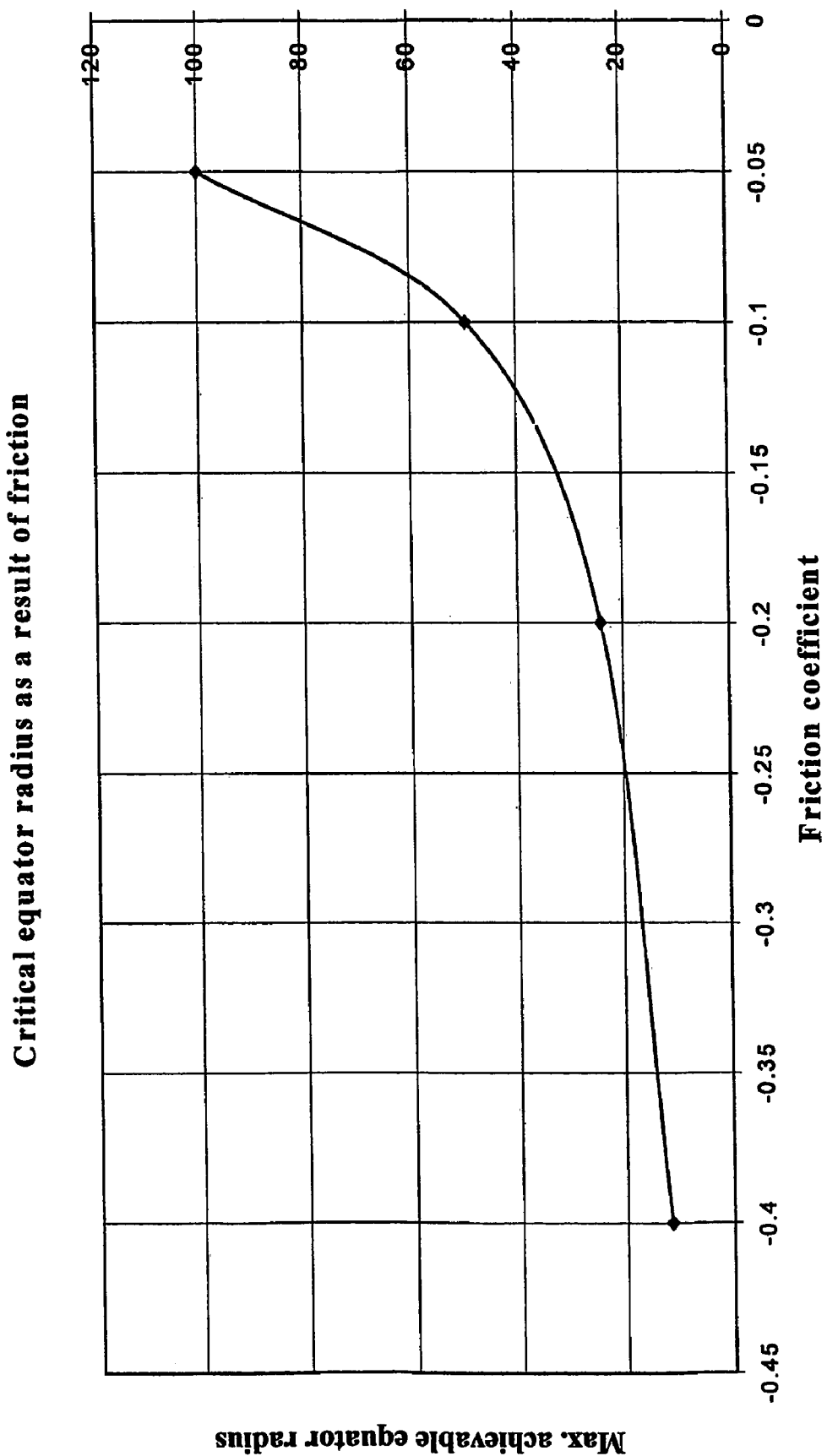
FIG. 9 depicts a graph of critical values of the dimensionless equatorial radius as a function of the applied friction.

Having selected a particular value for $\mu$, the radius of the pole opening may even become equal to zero with the value of the q-factor being sufficiently high. FIG. 9 depicts values of the corresponding dimensionless equatorial radii.

Figure 8:
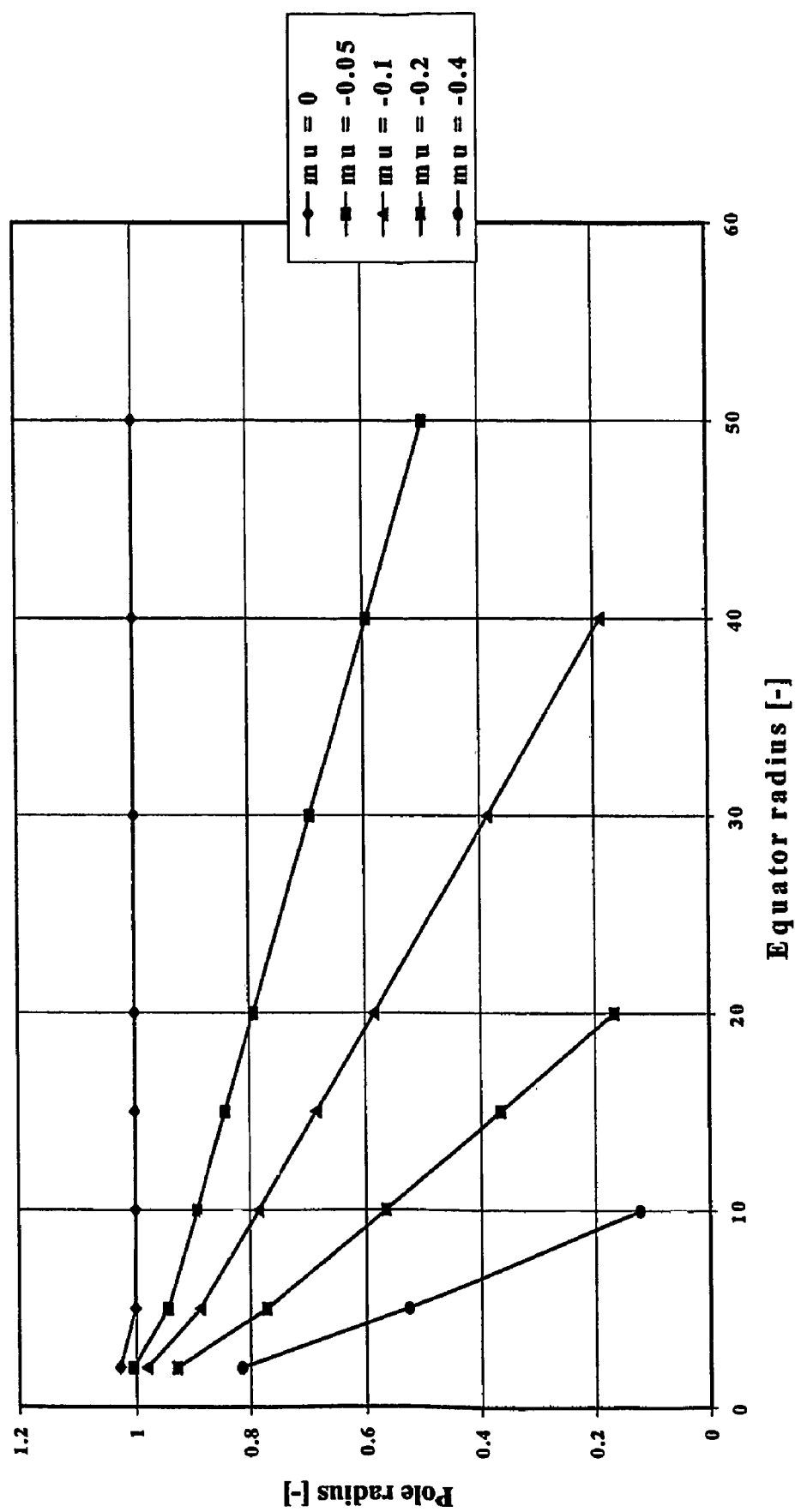
FIG. 8 depicts a graph of the dimensionless reduction of the pole opening for various μ-values as a function of the dimensionless equatorial radius.

FIGS. 8 and 9 thus relate to the case of achieving an isotensoidal shape by means of non-geodesic winding. It should be noted that the resulting meridian profile is significantly similar to the geodesic-isotensoidal one. This property allows for use in general of typical geodesic isotensoidal shapes notwithstanding the occurrence of friction. It should be noted that a particular q-value is directly coupled to the corresponding dimensionless equator radius.

The body of the pressurizable structure according to the invention can be either rigid or inflatable/deflatable. This distinction relates to the choice of use of matrix materials and in regard of the production process in terms of the desired quality, manufacturing time and required coefficient of friction between the fibre bundle and the surface which is to be overwound In regard of a rigid pressurizable structure, its design procedure may be substantially similar to that of known isotensoidal pressurizable structures, either with or without implementation of friction. This is well known in the art, and hence rigid structures will not be described further in this patent application.

The following is a description of the aspect of variation of mechanical properties of the pressurizable structure according to the invention when it is under internal pressure.

The starting point is a column of pressurizable structures (which are isotensoidal of shape and are geodesically wound) with certain values of the q-factor, the r-factor and the internal pressure. In the event of deflation, the pressure reduction may be described by the parameter $\xi$ which is equal to P(deflation)/P(initial). The dimensionless value of displacement (=decrease in height) of the highest vessel point depends on the pressure reduction and the initial values of the q-factor and r-factor, see FIG. 10.

Figure 10:
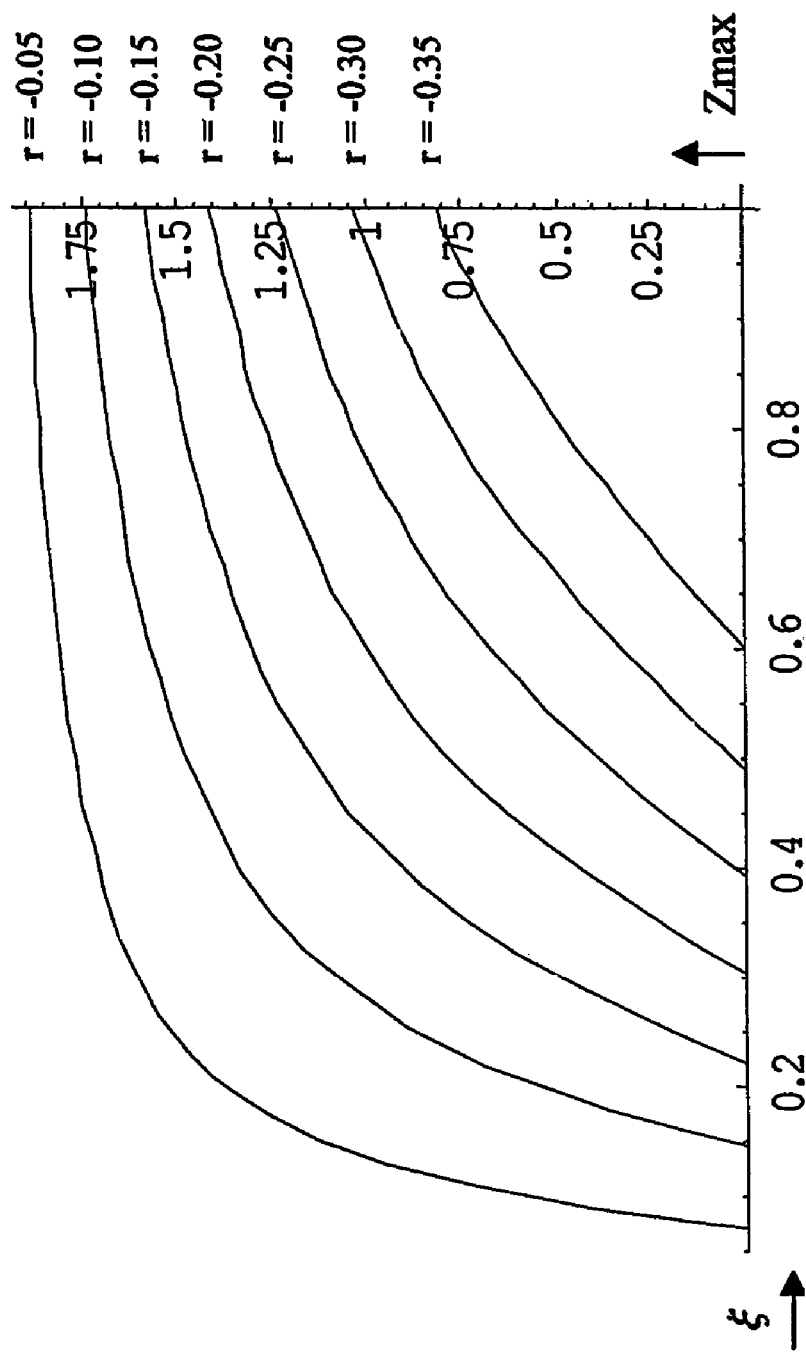
FIG. 10 depicts a graph of dimensionless values of displacement of the highest point of the structure as a function of the parameter ξ with different initial values of the r-factor.

FIG. 10 represents the displacement-pressure modification curve of one half of an axial section of a pressurizable structure. Depending on the number of interconnected axial sections, the curve in regard of the total pressurizable structure can be deduced on the basis of a series-connection of equivalent spring elements.

Figure 11:
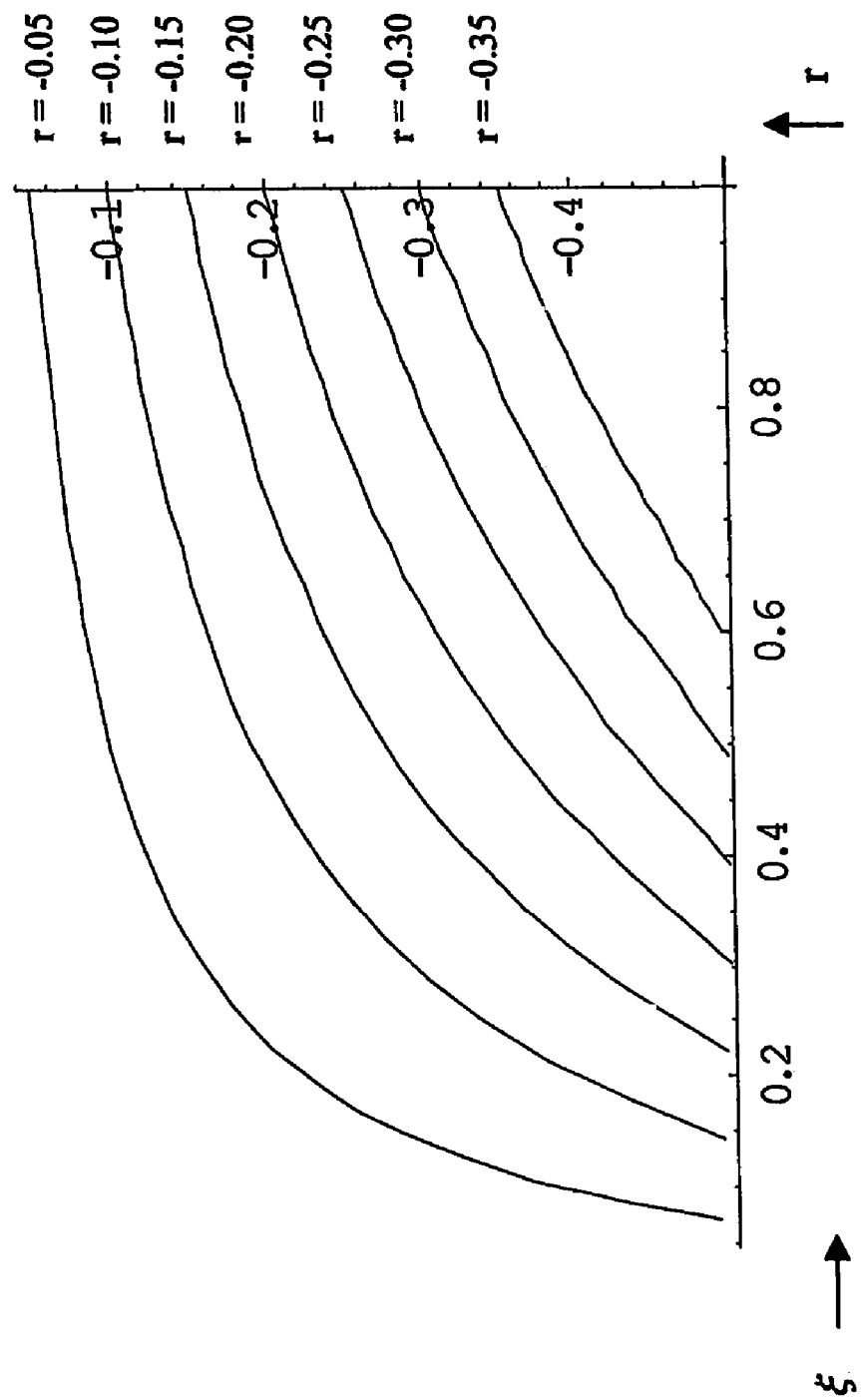
FIG. 11 depicts a graph of effective values of the r-factor as a function of the parameter ξ with different initial values of the r-factor.

A modification of an axial section due to a change in its internal pressure corresponds in effect to a new value of its r-factor, with the proviso that the value of the q-factor also changes such that the total fibre length remains practically unchanged. An example of this modification of the r-factor as a result of a change in the internal pressure is shown in FIG. 11.

Every initial $\{q,r\}$ configuration corresponds with distinctive values of minimum $\xi$ and effective r-factor. The minimum $\xi$ value is associated with a threshold value of the pressure which is required for countering the axial force at the top of the configuration of combined structures. The most important mechanical property of the pressurizable structure is the adaptability of the pressure-displacement characteristic thereof through variations in the values of the q-factor and/or of the r-factor as well as modification of the number of structures which are to be interconnected in parallel- or in series. Profiles on the basis of non-geodesic winding also provide an additional possibility for adapting the pressure-displacement characteristic of the pressurizable structure.

Figure 12:
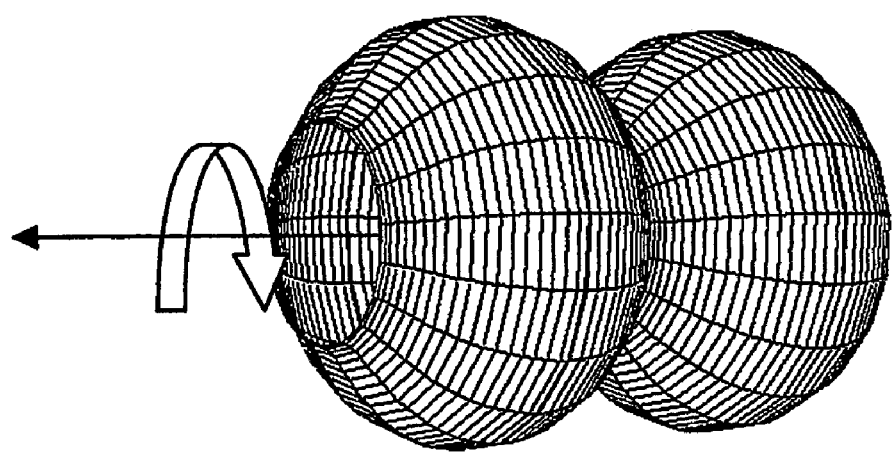
FIG. 12 depicts schematically translation and rotation of an axial section with respect to the longitudinal axis of the pressurizable structure.
Figure 13:
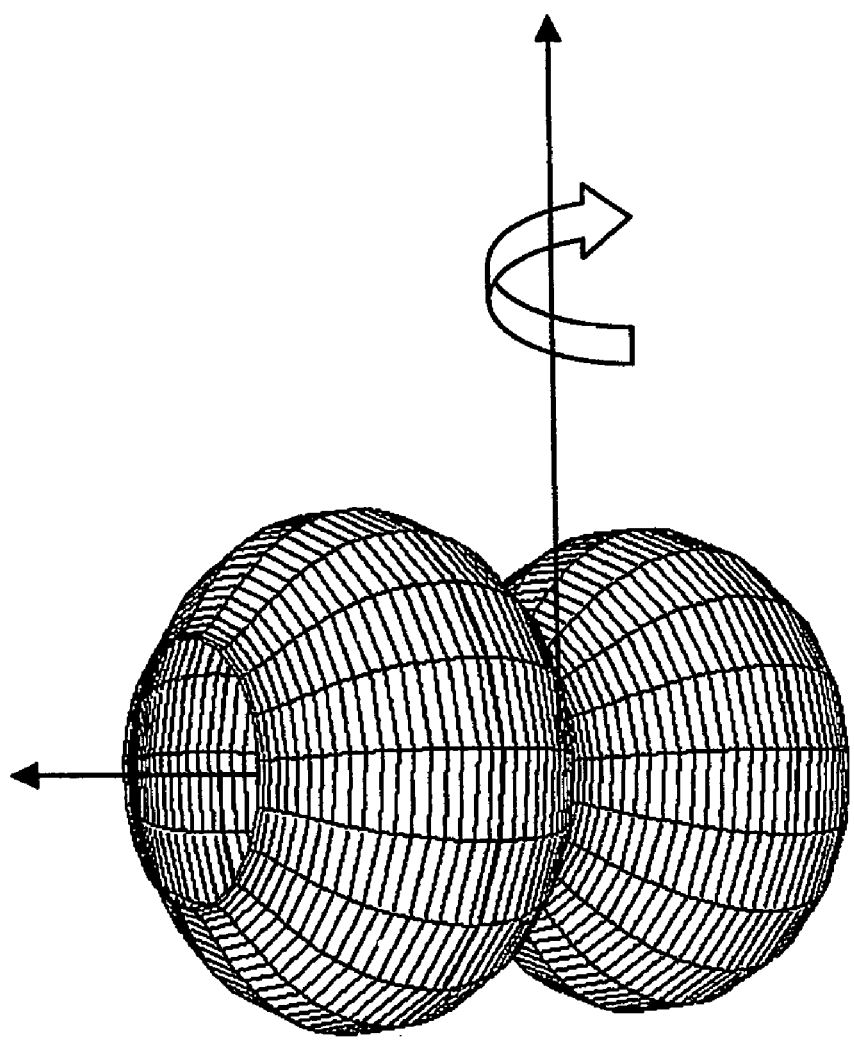
FIG. 13 depicts translation and bending of an axial section with respect to the longitudinal axis of the pressurizable structure.

In addition to longitudinal displacements of one or more axial sections of the pressurizable structure, it can also be pivotable with respect to the longitudinal axis of the structure. In other words, one or more axial sections can also be subject to rotation with respect to the longitudinal axis of the structure. This can be achieved through modification of the fibre path, such that the total fibre length is greater than the geodesic length, see FIG. 12. According to another possibility, such as in the case of a structure with an asymmetrical axial cross-section, at least one axial section of the structure is variable with respect to the longitudinal axis of the pressurizable structure. According to yet another possibility, an axial section of the structure is pivotable with respect to an axis, which axis is orthogonal with respect to the longitudinal axis of the pressurizable structure, see FIG. 13.

During deflation the value of the effective r-factor becomes increasingly negative. When this value is smaller then −1/q, the vessel will behave slightly stiffer then as indicated by the predicted pressure-displacement characteristic (see FIG. 10), due to extensive contact between adjoining axial sections of the pressurizable structure.

Figure 14:
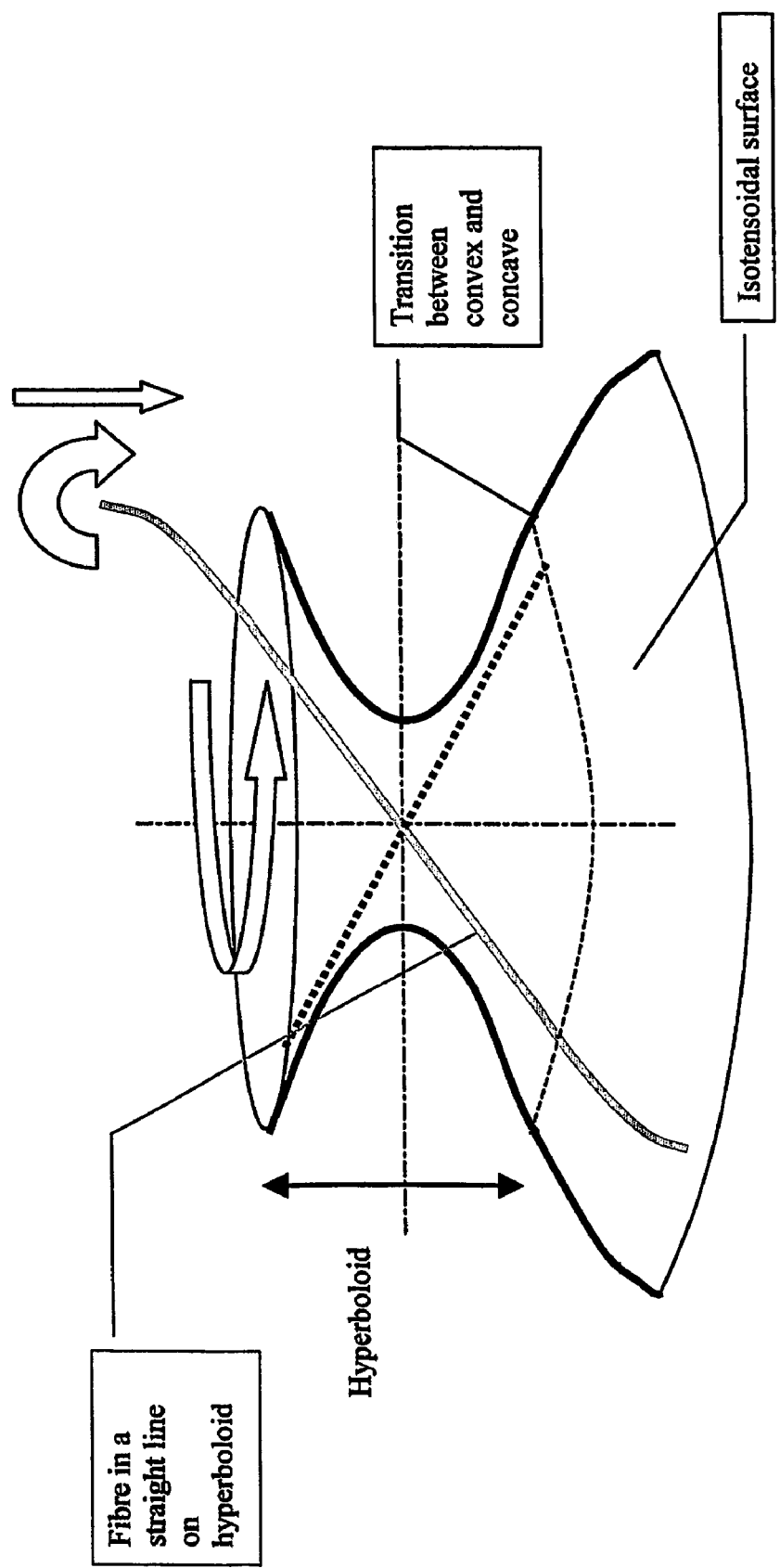
FIG. 14 depicts a hyperboloid axial section as an embodiment comprising an isotensoidal concave surface.

FIG. 14 depicts the use of a hyperboloid axial section as an embodiment which can simultaneously be subject to both the axial length of the axial section being variable with respect to the longitudinal axis of the pressurizable structure (translation of the axial section) as well as this axial section being pivotable with respect to the longitudinal axis of the pressurizable structure (rotation of the axial section). The length of the fibre which overwinds this axial section remains constant throughout.

Figure 15:
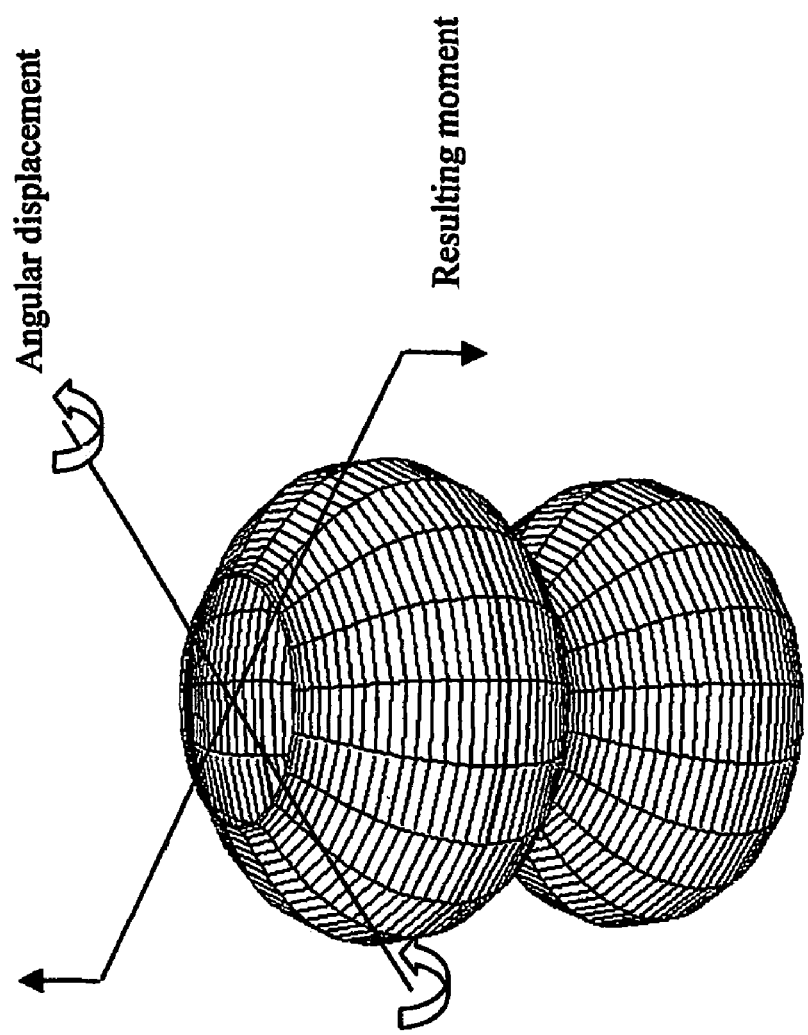
FIG. 15 depicts schematically a correction moment as a reaction to inclination at a pole of the pressurizable structure.
Figure 16:
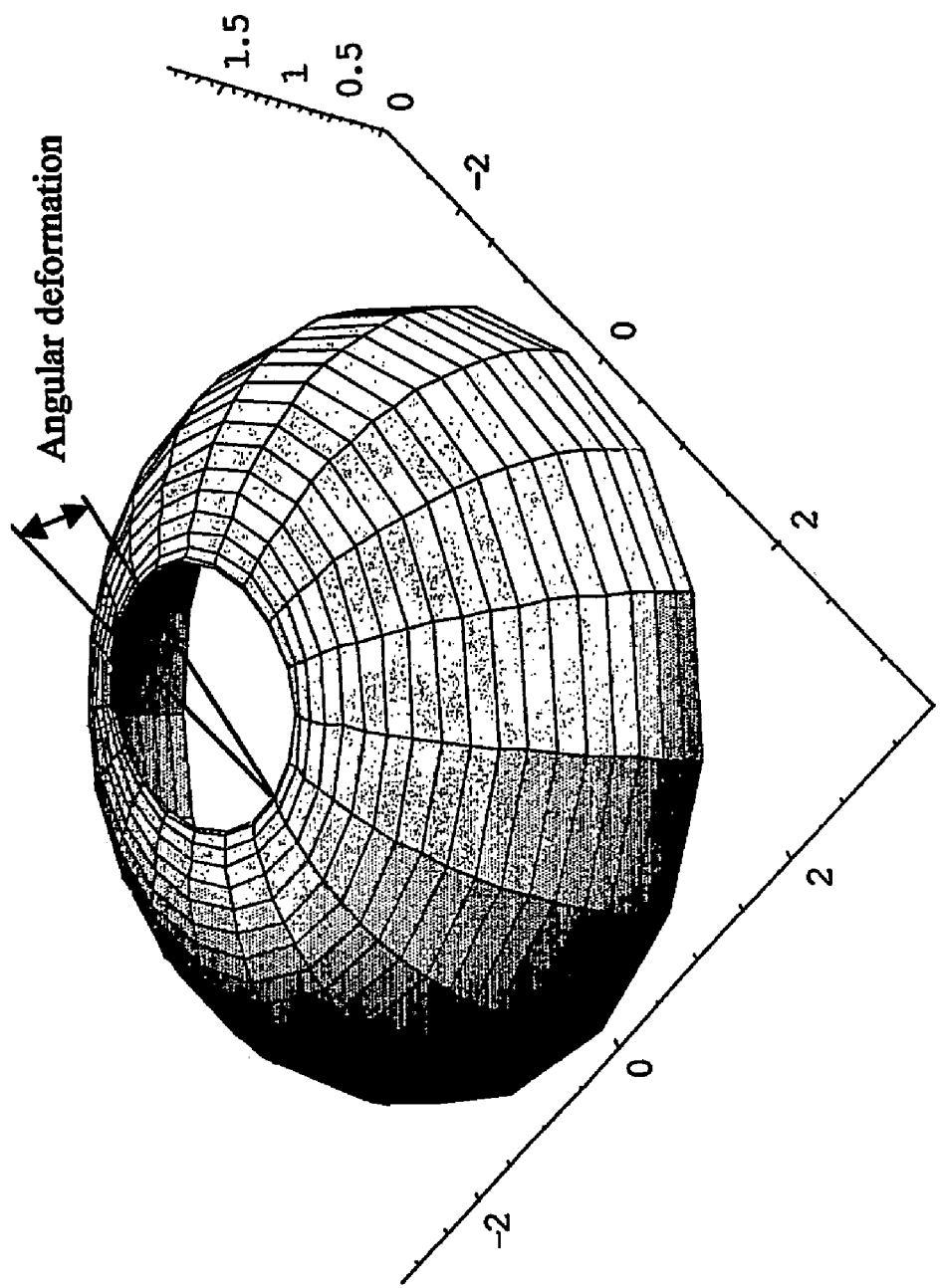
FIG. 16 depicts graphically the deformed state of an axial section of the pressurizable structure resulting from inclination at the pole of the pressurizable structure.

In regard of the stability of the pressurizable structure according to the invention, and with reference to FIG. 15: when a deviation of the plane perpendicular to the longitudinal axis at an end plane of an axial section occurs, then the structure shall give rise to a moment which will counteract with respect to this deviation. The behavior of a pressurizable structure according to the invention can be derived from the stability of a single axial section. When it is in a deformed state, the pressurizable structure can be considered to be as a structure having a slightly modified distribution of the equator radius compared to a non-deformed state, with changes at the pole radius remaining substantially negligible, see FIG. 16.

Figure 17:
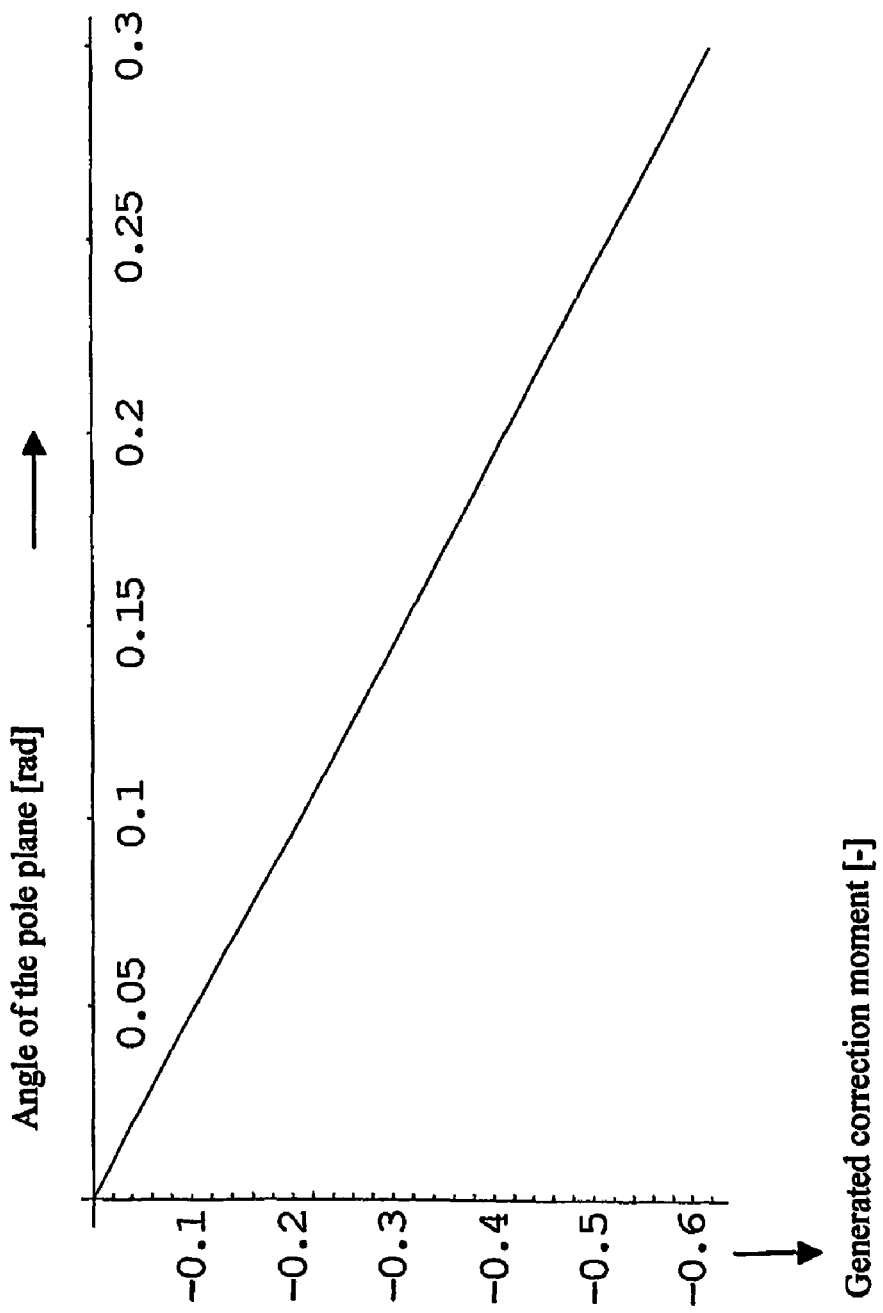
FIG. 17 depicts a graph of the correction moment which is generated as a function of angular deformation at the polar plane of the pressurizable structure.

As a result of the deformation, the fibres will undergo different loads as a function of their angular position in the equatorial plane of the axial section. With reference to FIG. 17, these loads will generate a moment tending to counter the deformation. The slope of the moment-angle curve depends on the design parameters $\{q,r\}$ and the applied fibre path (geodesic or non-geodesic). It is to be noted that the relationship between the deformation and the generated moment is linear.

Figure 18:
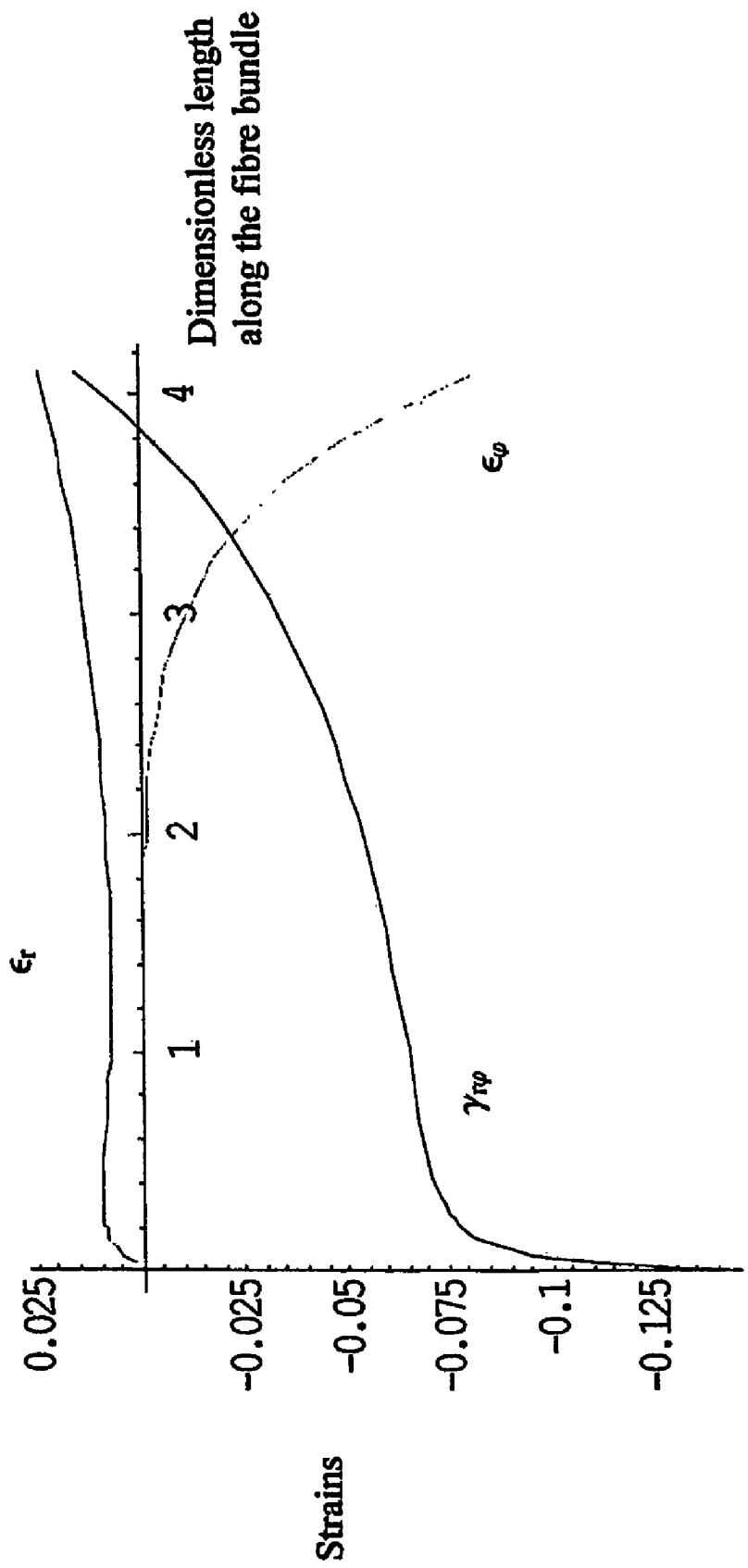
FIG. 18 depicts a graph of in-plane strains of an axial section when it is deformed into a flat surface.

The following is a description of the maximum stresses which arise in the event of deformation of a pressurizable structure according to the invention. Assume an initial situation of a structure comprising a stacked arrangement of axial sections. The maximum deformation imaginable is when the stacking of the structure is flattened to a state comparable to that of a stack of compact discs. In the flattened state, the axial sections have the same pole radius as in the initial state. As described above in relation to a hyperboloid structure, in order to maintain the same fibre length of a winding as in the initial state, the equator radius of the related axial section will have to increase. Consequently, the matrix should be able to withstand the generated stresses and strains. This analysis is based on the validity of a plane stress situation, whereby the fibres are considered to be infinitely stiff, e.g as in FIG. 18. When applying a typical rubber as the matrix material (e.g. Polyurethane), the maximum equivalent Hubert-Hencky stress remains below the yield value and occurs at the outer fibre locus (equator).

In regard of applicable pressure levels, these are theoretically unlimited, mainly depending on the applied fibre material and the number of windings. In practice, even when the strongest fibres are used, the physical volume of fibres practicable at the poles limits the number of windings. The latter sets a limit on the design pressure. Generally, pressure levels of e.g. 300 [bar] are achievable. This level forms a significant difference between a typical unreinforced inflatable structure and the pressurizable structure comprising combinations of axial sections according to the invention.

The pressurizable structure according to the invention can be used in various fields of technology. Some practical embodiments are pressure vessels which offer a comprehensible occupation of the available installation space at an optimum strength-to-weight ratio; adjustable springs; smart actuators serving as replacements for hydraulic or pneumatic cylinders; and robotic arms and elevators which can bear high loads and perform movements in multiple degrees of freedom. Other embodiments comprise pipelines such as flexible pipelines of which the dimensions and load-bearing properties are alterable. Also, large structures such as high-rise buildings comprising low-weight pressurizable axial sections according to the invention are feasible. An example relates to a vehicle-parking building which comprises a variable number of parking decks, whereby one or more decks comprise struts formed from pressurizable axial sections according to the invention and whereby a deck is taken into use by pressurizing the same only when so required. Yet further embodiments comprise smart structures such that when these are put to use as load-carrying members, the stiffness characteristics of the resulting structure can be adjusted, e.g. in the case of adaptation of the resonance frequencies of buildings during an earthquake or a blizzard).

Figure 19:
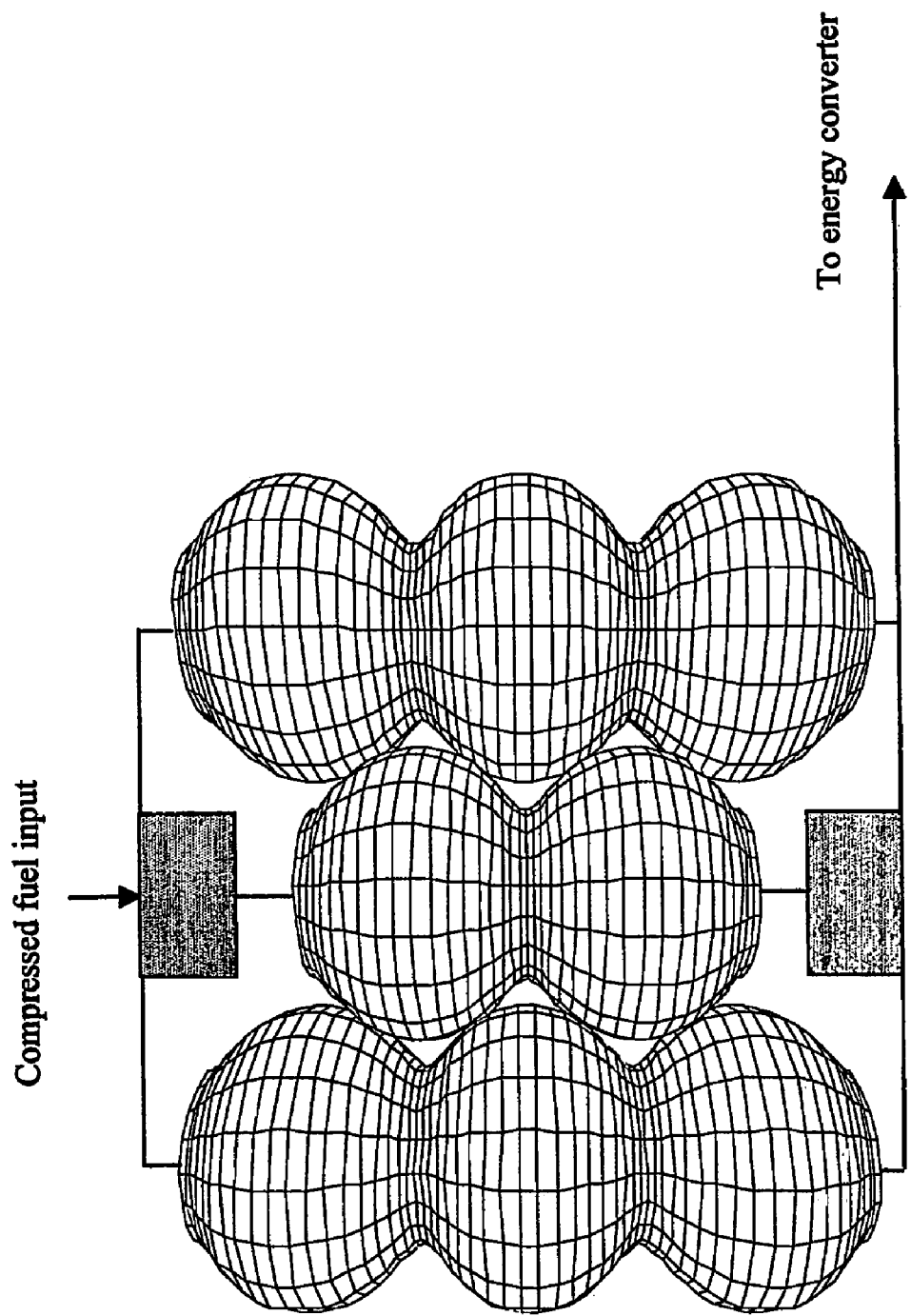
FIG. 19 depicts schematically a two-dimensional arrangement of pressurizable fuel tanks according to the invention.

With respect to the constraints of a given installation space, there are various possibilities of filling it with high-performance composite pressure vessels having considerable operating pressure levels. Such a use can be based on an arrangement according to FIG. 19. A three-dimensional arrangement can advantageously increase the occupation of the space available. Another advantage of filling a space with an arrangement comprising several tanks is that in the event of a feed failure, there will still be enough fuel in the remaining pressurizable sections comprised in the arrangement to the end of keeping the related energy converter in operation. Such a fail-safe property is advantageous particularly in light of e.g. the aerospace industry.

Figure 20:
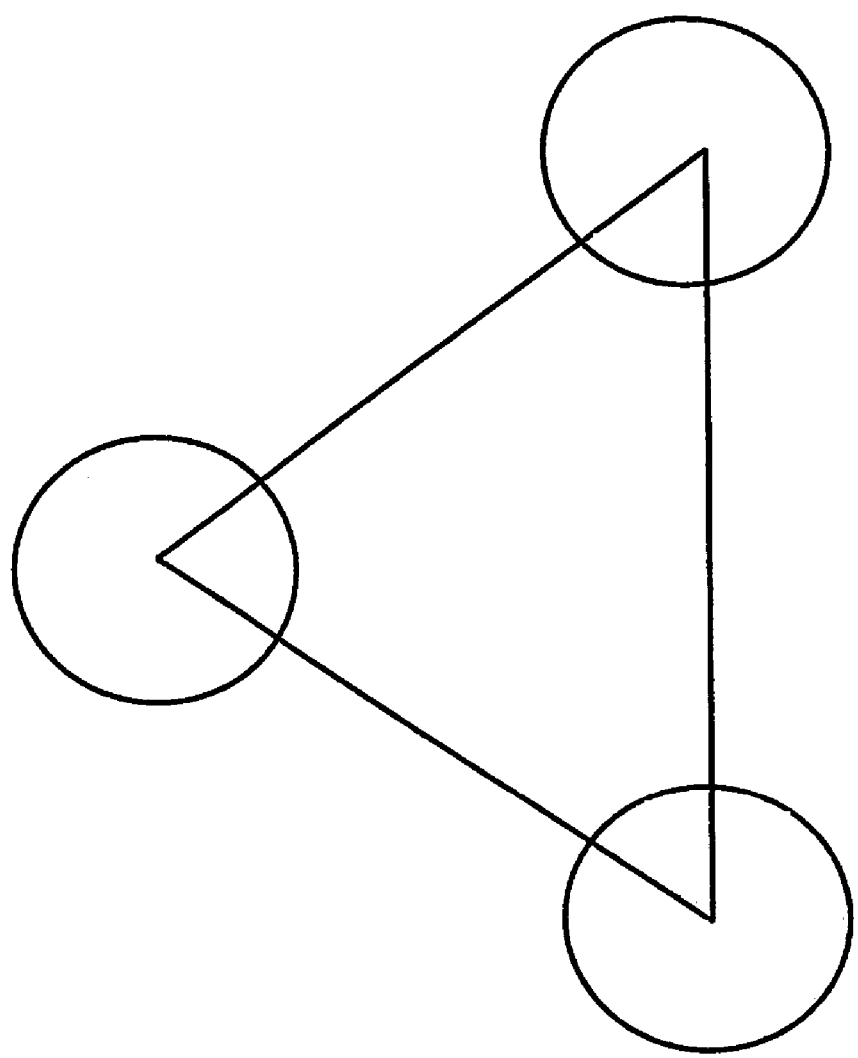
FIG. 20 depicts schematically a plan view of a combination of three pressurizable structures according to the invention.

In regard of the use of a pressurizable structure according to the invention as an adjustable spring: this can be achieved through a variation of the internal pressure of the axial sections of the structure in conjunction with use of its properties of adjustable values of its q-factor, r-factor and the choice of geodesic or non-geodesic trajectories of the fibre windings. Since high internal pressures are applicable, spring means with small dimensions can be implemented. With reference to FIG. 20, an arrangement of axial sections linked together in parallel and at different loci is advantageous in regard of the performance of complicated movements whereby there are also considerable external loads exerted on the pressurizable structure.

In other uses involving e.g. hydraulic or pneumatic cylinders which are subject to considerable external loads, the functions of these cylinders can be implemented by means of an arrangement of pressurizable structures, as described above, which means also provide for the advantage of eliminating, or at least reducing, leaks and wear, the latter as a result of interaction between different moving mechanical parts. Considering that the pressure-displacement curve of said arrangement of pressurizable structures is readily adjustable, specific uses relate to elevators, excavators and heavy industrial robots, see FIG. 21A-C.

In regard of the use of a pressurizable structure according to the invention as a pipeline, the combination of a high pressure-bearing capability, of translational and rotational flexibility in addition to, theoretically, an infinite length of the pressurizable structure allows for the construction of continuous, adaptable pipelines. Depending on the required flexibility, the degrees of concavity and convexity are readily adjustable. The pipelines can be constructed on-site, or be transported in a compact, unpressurized state. The latter leads advantageously to a considerable reduction of the volume of the structure.

A further use of a pressurizable structure according to the invention relates to entitites such as struts or shoring means for buildings. Axial sections can be connected to each other by means of continuous overwinding to any desired length, even ad infinitum at least in principle, to form buildings. For example, consider a square building which comprises 10 floors. Consider further as a starting point that each floor is dimensioned to bear a floor load of 300 [kg/m$^2$] and that it is shaped as a square of 10 [m]×10 [m]. The required ceiling height of each floor is set to 3 [m]. At the ground floor, the maximum allowable radius of the pressurizable structure, which comprises a number of different axial sections, is set to be 1.25 [m]. Each of the four corners of the building is borne by one strut in the form of a pressurizable structure, see FIG. 22. Calculations indicate that the required pressure at the ground floor is approx. 50 [bar]. If the pressurizable structure is to be continued through to the adjoining floor level, then the pressure of the adjoining axial section can be varied in accordance to the cumulative loads on all higher-lying floors. In situations in which a decrease of the equatorial radius to the maximum extent possible is required, a solution can be found through the use of smaller lengths of axial sections of which the pressurizable structure is comprised. Preferably, each floor should comprise an integer number of axial sections which extend exactly to the required ceiling height and which are in accordance with the pressure level required for the ground floor. The result of this analysis is depicted graphically in FIG. 23.

If pressure valves are comprised between the different floors of the pressurizable structure according to the invention, then this offers the possibility of tailoring the pressure levels at each floor and it thus provides for an adjustable building. In practice, it would be preferable to construct each floor as being formed by a modular type of pressurizable structure, whereby the pressurizable structure in turn comprises a number of axial sections which are adjoined by means of overwinding. A modular type of pressurizable structure does not give rise to technical problems associated with the introduction of floor loads other than at an end of a pressurizable structure. The possibility of building floors formed by modular pressurizable structures allows for addition or removal of such floors, by which adjustable buildings can be made to be readily convertible for different functions, e.g. a factory hall being converted into a multi-deck parking garage. Further, the Eigen-frequencies of existing building structures, such as a steel framework of a building, can be made adaptable with respect to varying conditions, e.g. earthquakes and blizzards. Even further, a building can be built as follows. A pressurizable structure comprising a number of axial sections is put in place in its unpressurized state. The highest axial section is brought under internal pressure up to the desired floor load-bearing capacity. As required, e.g. a steel framework can be mounted onto the pressurized axial section. The adjoining axial section which is to form the underlying floor is then brought under internal pressure. Through repetition, each floor can be made at the ground level and raised. Such a method of constructing buildings leads advantageously to reduction of construction time and costs.

In another aspect, the invention relates to a method of producing pressurizable structures. Basically, the pressurizable structures according to the invention can be produced by means of filament winding and braiding. There are several possibilities which allow for choice of production speed and of the implementation of friction. For example, use can be made of winding or braiding with dry fibres, followed by application of matrix material by means of dimpling or spraying on to the fibres. Also, use can be made of winding or braiding with wet fibres, i.e. fibres which are impregnated with either a thermoplastic or a thermosetting matrix material. In the case of a pressurizable structure, if applicable, the matrix material should have deformation capabilities.

In any method of production, a body is required (mould or liner). The latter can remain in the structure after completion of the overwinding, as in the case of a rigid pressurizable structure which comprises several axial sections. In other cases, the Otherwise, the body should be flexible in order to withstand the deformations of a pressurizable structure. Another possibility relates to the use of a removable liner in connection with a step of washing out, deflating or mechanically reducing its volume (such as with a so-called deployable liner). Filament winding is a well-known method of production, so only braiding will be described hereinafter in light of the possibility it offers for producing very long structures. With reference to FIG. 24, consider the production of a strut for supporting a floor of a building. The ring shown in the Figure comprises the necessary number of independent fibre bundles required for overwinding the axial sections which are to be comprised in the pressurizable structure. The ring can undergo both a translational as well as a rotational movement. The fibres are to be drawn from a central arrangement of spools, whereby the central arrangement also also translates and rotates with respect to the longitudinal axis of the pressurizable structure. Alternatively, the fibre spools themselves can be mounted on the ring itself. Overwinding can be continued from one axial section on to an adjoining axial section, with repetition hereof till completion of the pressuriable structure. In practice, there may be a limitation in regard of the total fibre length available on a spool. It should be noted that braiding can be implemented with an acceptable degree of accuracy only with the application of exclusively geodesic paths.

Figure 6:
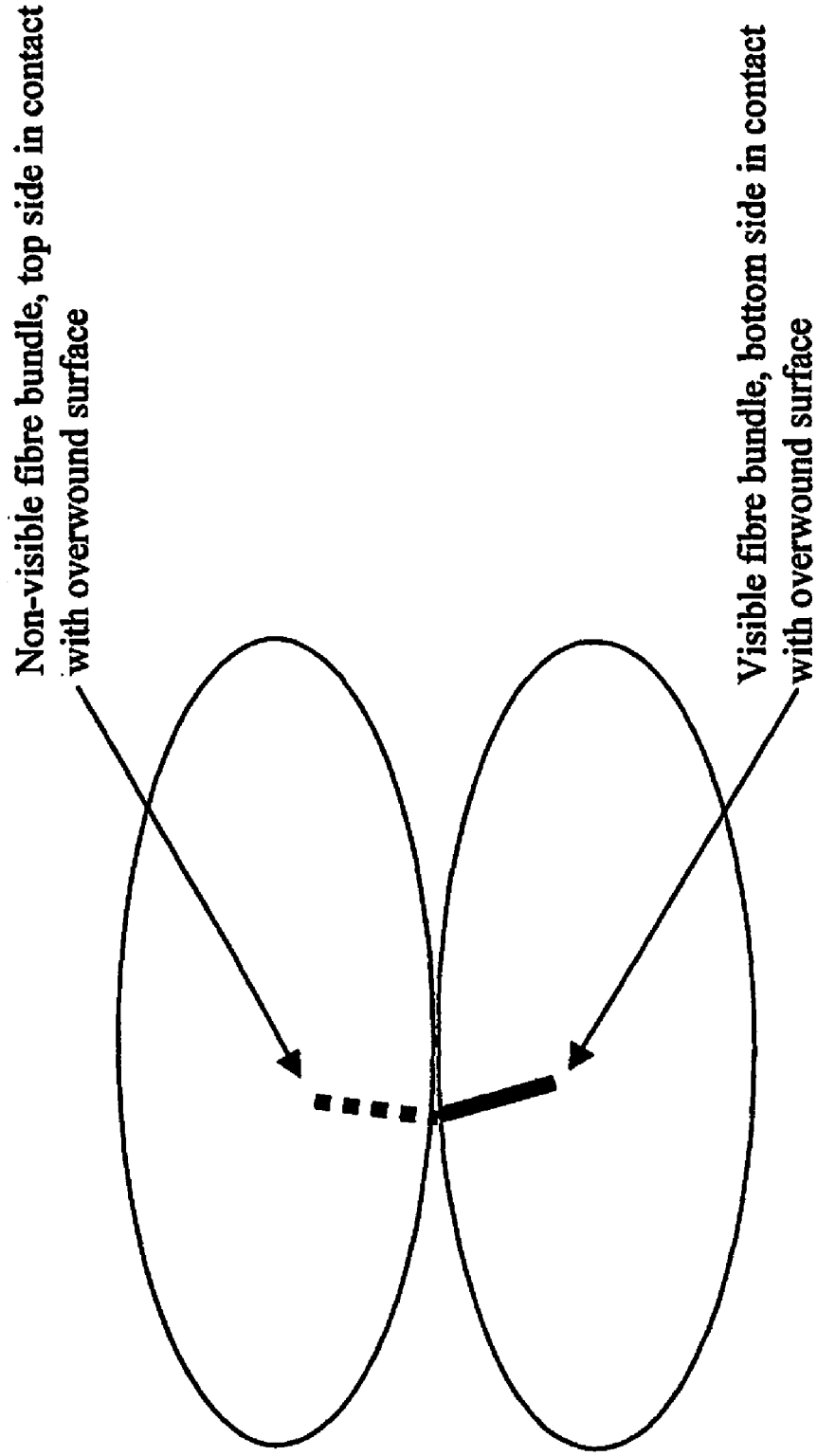
FIG. 6 depicts schematically a reversal of the side of the fibre which is in contact with the body.

In regard of a transition between adjoining axial sections: depending on the r-factor, the fibre bundle undergoes a change of its contact side, see FIG. 6. In this case, the method of braiding is easily implemented, because no additional spool rotations are required. In case of reversal of the side of the fibre which is in contact with the body, the fibre undergoes a twist whereby the spools mounted on the braiding ring have to rotate over the angle of twist with respect to the axis between the centre of gravity of the body and the centre of gravity of the related spool. This is achievable by a proper construction of the spool attachments on the ring. A central spool arrangement will not work in such cases, other than in the case of braiding whereby the fibre bundle does not have to undergo a twist.

In regard of the width of the applied fibre bundle, in general a broad fibre will lead to less stacking of the fibre at the poles and to a reduction of braiding time. However, a broad tape may make it difficult to achieve a winding geometry without any fibre interference at the transitional areas between adjoining axial sections. It should be noted that fibre interference does not occur if there is a twist in the fibre trajectory.

In regard of the choice between filament winding or braiding, it should be noted that filament winding results in an accurate placement of each fibre over the axial sections (even in the case of application of non-geodesic windings). It also leads to enhanced strength of the pressurizable structure since there is only one begin point and one endpoint of the applied fibre bundle. In the case of braiding, every applied winding will have its own begin point and endpoint, which in general results in a reduction of the strength of the pressurizable structure. A proper fixation of the fibre bundles in the pole area can alleviate any related problem.

DEFINITIONS

| | |
|---|---|
| Isotensoidal shape | A rotationally symmetric shape designed in such a way that the applied fibres are tensioned in exactly the same magnitude. |
| Dimensionless equatorial radius | The actual equatorial radius divided by the radius of the pole opening. |
| Dimensionless pole opening radius | The minimum radius of the optimal part of the vessel divided by the radius of the pole opening (usually very close to 1). |
| q-factor | The squared ratio of the dimensionless equatorial- and pole opening radius. |
| r-factor | A dimensionless parameter describing the axial load on the pole opening as a fraction of the internal pressure load. |
| r(z = 0) | The critical value of r forcing the pole opening of a vessel to become on the same altitude as the equator. |
| Geodesic trajectory | The path connecting two points on an arbitrary surface at the shortest possible way. |
| Non-geodesic trajectory | A friction-requiring path connecting two points on an arbitrary surface. |
| μ | The coefficient of friction between the fibre bundle and the surface of application. |
| ξ | A dimensionless parameter expressing the pressure of a partially deflated vessel as a fraction of the original one. |
| εr | Radial strain in the plane of the vessel surface. |
| εφ | Circumferential strain in the plane of the vessel surface. |
| γrφ | Shear strain in the plane of the vessel surface. |

The invention claimed is:

1. A fibre reinforced pressurizable structure comprising an integrally formed gas or fluid-tight body having a continuous outer circumferential surface with a rotation-symmetrical axis that terminates in axial ends, the body being overwound as an isotensoide with one or more fibre filaments, the one or more fibre filaments having a longitudinal axis defined along their length, wherein radius of the body outer surface varies with respect to the rotation-symmetrical axis, such that said body outer surface defines at least one concave surface section spaced apart from the axial ends, wherein each concave surface section has a local minimum radius, and the outer surface further defines at least one convex surface section spaced apart from the axial ends, wherein each convex surface section has a local maximum radius, wherein the at least one concave surface section about its entire outer surface spanning its local minimum radius is continuously overwound with the one or more fibre filaments.

2. A fibre reinforced pressurizable structure according to claim 1, wherein the pressurizable structure is quasi-geodesically overwound in a continuous fashion.

3. A fibre reinforced pressurizable structure according to claim 1, wherein the longitudinal orientation of the one or more fibre filaments along a finite length thereof is oriented substantially perpendicular with respect to the rotation-symmetrical axis of the structure.

4. A fibre reinforced pressurizable structure according to claim 1, wherein the one or more fibre filaments undergo torsion with respect to the longitudinal center-line thereof when the pressurizable structure is in a pressurized state, whereby substantially one side of the curved fibre circumference remains in contact with the body in the at least one concave surface section.

5. A fibre reinforced pressurizable structure comprising an integrally formed gas or fluid-tight body having a continuous outer circumferential surface with a rotation-symmetrical axis that terminates in axial ends, the body being overwound as an isotensoide with one or more fibre filaments, the one or more fibre filaments having a longitudinal axis defined along their length, wherein radius of the body outer surface varies with respect to the rotation-symmetrical axis, such that said body outer surface defines at least one concave surface section spaced apart from the axial ends, wherein each concave surface section has a local minimum radius, and the outer surface further defines at least one convex surface section spaced apart from the axial ends, wherein each convex surface section has a local maximum radius, wherein the at least one concave surface section about its entire outer surface spanning its local minimum radius is continuously overwound with the one or more fibre filaments as an isotensoide, and the fiber filaments are twisted longitudinally during fabrication of the structure so that one circumferential side of the fiber filaments are in contact with the at least one concave surface section and the other circumferential side of the fiber filaments are in contact with the at least one convex surface section.

6. A fibre reinforced pressurizable structure according to claim 1, wherein the body is flexible, i.e., non-rigid and formed about the one or more fibre filaments.

7. A fibre reinforced pressurizable structure according to claim 1, whereby the axial length of at least one axial section of the pressurizable structure is variable with respect to the longitudinal axis of the pressurizable structure.

8. A fibre reinforced pressurizable structure according to claim 1, wherein at least one axial section of the pressurizable structure is pivotable with respect to the longitudinal axis of the pressurizable structure.

9. A fibre reinforced pressurizable structure according to claim 1, wherein at least one axial section of the structure is pivotable with respect to an axis, wherein the axis is orthogonal to the longitudinal axis of the pressurizable structure.

10. A fibre reinforced pressurizable structure according to claim 7, wherein at least one axial section of the pressurizable structure comprises a combination of at least two of the following technical elements; (i) at least one axial section of the pressurizable structure is pivotable with respect to the longitudinal axis of the pressurizable structure; (ii) the axial length of the at least one axial section of the structure is variable with respect to the longitudinal axis of the pressurizable structure; (iii) the axial section of the structure is pivotal with respect to an axis, wherein the axis is orthogonal to the longitudinal axis of the pressurized structure.

* * * * *